(12) United States Patent
Suzuki et al.

(10) Patent No.: US 7,356,617 B2
(45) Date of Patent: Apr. 8, 2008

(54) PERIODIC CONTROL SYNCHRONOUS SYSTEM

(75) Inventors: Kenji Suzuki, Tokyo (JP); Yuusuke Ushio, Tokyo (JP); Shinichiro Chino, Tokyo (JP); Satoru Nakai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 610 days.

(21) Appl. No.: 09/841,102

(22) Filed: Apr. 25, 2001

(65) Prior Publication Data

US 2002/0065940 A1 May 30, 2002

(30) Foreign Application Priority Data

Nov. 27, 2000 (JP) .............................. 2000-360280

(51) Int. Cl.
*G06F 15/16* (2006.01)
*G06F 15/173* (2006.01)
*H04L 7/00* (2006.01)

(52) U.S. Cl. ...................... 709/248; 709/223; 375/356

(58) Field of Classification Search ................ 709/248, 709/400; 375/356
See application file for complete search history.

(56) References Cited

U.S. PATENT DOCUMENTS

| | | | | |
|---|---|---|---|---|
| 4,677,614 A | * | 6/1987 | Circo | 370/222 |
| 5,689,688 A | * | 11/1997 | Strong et al. | 709/400 |
| 5,822,381 A | * | 10/1998 | Parry et al. | 375/356 |
| 5,887,143 A | * | 3/1999 | Saito et al. | 709/248 |
| 5,988,846 A | | 11/1999 | Flamm et al. | |
| 6,061,802 A | | 5/2000 | Gulick | |
| 6,157,957 A | * | 12/2000 | Berthaud | 709/248 |
| 6,185,217 B1 | * | 2/2001 | Ando et al. | 370/403 |
| 6,202,067 B1 | * | 3/2001 | Blood et al. | 707/10 |
| 6,351,821 B1 | * | 2/2002 | Voth | 713/600 |
| 6,587,957 B1 | * | 7/2003 | Arsenault et al. | 713/500 |

FOREIGN PATENT DOCUMENTS

DE 19626287 A1 7/1996

OTHER PUBLICATIONS

"Digital Interface For Communication Between Controls And Drives For Numerically Controlled Machines"; *SERCOS interface*, Sep. 1991.
IEEE Standard for a High Performance Serial Bus, 1996.
"Consumer audio/video equipment-Digital interface-"; Part 4:: MPEG2-TS data transmission, IEC 61883-4.

* cited by examiner

*Primary Examiner*—Nathan Flynn
*Assistant Examiner*—David England
(74) *Attorney, Agent, or Firm*—Leydig, Voit & Mayer, Ltd.

(57) ABSTRACT

A controller controls a time stamp providing unit to provide a periodic transfer packet with a time stamp showing the synchronous timing of periodic control designated by the control period timer using the global time indicated by a global timer. Devices are corrected to synchronize operation period timers with the periodic control, by using the time difference between the synchronous timing time of periodic control indicated by the time stamp of the transmitted periodic transfer packet and the global time indicated by global timers, at periodic operation timing of the operation period timers.

12 Claims, 23 Drawing Sheets

PERIODIC CONTROL SYNCHRONOUS SYSTEM

FIELD OF THE INVENTION

The present invention relates to a period control synchronous system for synchronizing periodic control between one or more controllers connected to a network and one or more devices such as servo motors, connected to the network.

BACKGROUND OF THE INVENTION

Conventionally, as a network system for servo motors, for example, a system using the SERCOS interface (IEEE1491) has been known. This SERCOS interface is designed, as shown in FIG. 23, to synchronize the periodic operation of servo drive by transmitting a synchronous packet (sync-telegram) to the servo drive by using the interface in every control period of periodic control.

In the system using the SERCOS interface shown in FIG. 23, the control period of all servo drives (slaves) is synchronized by broadcasting the synchronous packet (sync-telegram) to all servo drives (slaves) periodically from the controller (master).

However, in the conventional system using the SERCOS interface, the precision of the control period is determined by the precision of periodic transmission of the synchronous packet (sync-telegram), and if transfer of a large packet is attempted at the same time as asynchronous communication between slaves, jitter occurs in the transmission period of the synchronous packet (sync-telegram), and packet transfer of large size or asynchronous communication between slaves cannot be achieved. Thus, flexibility is lacking.

SUMMARY OF THE INVENTION

It is an object of this invention to realize a periodic control synchronous system capable of performing flexible communication such as packet transfer of large size and asynchronous communication between slaves, while maintaining the precision of synchronism of periodic control, not required to synchronize the periodic control by the periodic transfer timing of periodic packet, and without causing effects on the precision of synchronism of periodic control by the precision of periodic transfer of periodic packet.

The periodic control synchronous system according to one aspect of this invention performs synchronization of periodic control between one or more controllers connected to a network and one or more devices connected to the network. In this periodic control synchronous system, the controller and device comprise a global timer each controlled through the network, and are synchronized in periodic control by generating synchronous timing for periodic control by using the global time indicated by the global timer.

According to the above-mentioned aspect, one or more controllers connected to a network and one or more devices connected to the network are synchronized in periodic control by generating synchronous timing of the periodic control between the controller and device, by using the global time indicated by the global timer controlled through the network. Therefore the periodic transfer speed of periodic packet does not cause effect on the precision of synchronism of periodic control without synchronizing the periodic control by the periodic transfer timing of the periodic packet transferred uniformly.

Furthermore, the global timer of the controller is set at a master global timer, the global timer of the device is set at a slave global timer. Furthermore, the controller comprises a transmitting unit which transmits the periodic timing time using the global time indicated by the master global timer to the device as a period transfer packet. Furthermore, the device comprises a periodic control unit which performs periodic control by using the synchronous timing time of the periodic transfer packet transmitted by the transmitting unit and the global time indicated by the slave global timer.

Thus, the transmitting unit of the controller transmits the synchronous timing time using the global time indicated by the master global timer to the device as periodic transfer packet, and the periodic control unit of the device controls the period by using the synchronous timing time of the periodic transfer packet transmitted by the transmitting unit and the global time indicated by the slave global timer.

Furthermore, the device further comprises an operation period timer which controls the operation period of the device itself, and a correcting unit which corrects the operation period timer by determining the time difference between the global time indicated by the global timer of the device and the synchronous timing time indicted by the controller at the synchronous timing indicated by the operation period timer, and determines the timer correction value or timer period correction value of the operation period timer on the basis of the obtained time difference.

Thus, the correcting unit of the device determines the time difference between the global time indicated by the global timer of the device and the synchronous timing time indicted by the controller at the synchronous timing indicated by the operation period timer, and determines the timer correction value or timer period correction value of the operation period timer on the basis of the obtained time difference, and thereby corrects the operation period timer.

Furthermore, the correcting unit comprises a detecting unit which detects whether the time difference is within a specified allowable range or not, and controls to correct the operation period timer on the basis of the timer correction value or timer period correction value when the time difference is within the specified allowable range, and not to correct the operation period timer when the time difference is out of the specified allowable range.

Thus, the detecting unit detects whether the time difference is within a specified allowable range or not, and the correcting unit controls to correct the operation period timer on the basis of the timer correction value or timer period correction value when the time difference is within the specified allowable range, and not to correct the operation period timer when the time difference is out of the specified allowable range.

Furthermore, the controller further comprises a control period timer which controls the control period of the controller itself, and a correcting unit which corrects the control period timer by determining the time difference between the global time indicated by the global timer of the controller and the synchronous timing time indicted by the controller at the synchronous timing indicated by the control period timer, and determines the timer correction value or timer period correction value of the control period timer on the basis of the obtained time difference.

Thus, the correcting unit of the controller corrects the control period timer by determining the time difference between the global time indicated by the global timer of the controller and the synchronous timing time indicted by the controller at the synchronous timing indicated by the control period timer, and determines the timer correction value or timer period correction value of the control period timer on the basis of the obtained time difference.

Furthermore, the correcting unit comprises a detecting unit which detects whether the time difference is within a specified allowable range or not, and controls to correct the control period timer on the basis of the timer correction value or timer period correction value when the time difference is within the specified allowable range, and not to correct the control period timer when the time difference is out of the specified allowable range.

Thus, the detecting unit detects whether the time difference is within a specified allowable range or not, and the correcting unit controls to correct the control period timer on the basis of the timer correction value or timer period correction value when the time difference is within the specified allowable range, and not to correct the control period timer when the time difference is out of the specified allowable range.

The periodic control synchronous system according to another aspect of this invention performs synchronization of periodic control between one or more controllers connected to a network and one or more devices connected to the network. In this periodic control synchronous system, the controller comprises a first global timer controlled through the network, a control period timer which controls the control period of periodic control, a time stamp providing unit which provides the periodic transfer packet with the time stamp showing the synchronous timing of the period control designated by the control period timer by using the global time indicated by the first global timer, and a transmitting unit which transmits the periodic transfer packet provided with the time stamp to the device. Furthermore, the device comprises a second global timer controlled through the network, and periodic control unit which synchronizes the operation period of the device with the control period by using the synchronous timing time of the periodic control indicated by the time stamp of the periodic transfer packet transmitted by the transmitting unit and the global time indicated by the second global timer.

According to the above-mentioned aspect, the time stamp providing unit provides the periodic transfer packet with the time stamp showing the synchronous timing of the period control designated by the control period timer by using the global time indicated by the first global timer, the transmitting unit transmits the periodic transfer packet provided with the time stamp to the device, and the periodic control unit synchronizes the operation period of the device with the control period by using the synchronous timing time of the periodic control indicated by the time stamp of the periodic transfer packet transmitted by the transmitting unit and the global time indicated by the second global timer.

Furthermore, the controller comprises a latch unit which latches the global time of the first global timer, and holds the latched time, the control period timer latches the global time of the first global timer in the latch unit at the synchronous timing of the periodic control designated by the control period timer, and the time stamp providing unit provides the periodic transfer packet with the time stamp having the global time latched by the latch unit offset by the portion of the control period.

Thus, the control period timer latches the global time of the first global timer in the latch unit at the synchronous timing of the periodic control designated by the control period timer, and the time stamp providing unit provides the periodic transfer packet with the time stamp having the global time latched by the latch unit offset by the portion of the control period, thereby instructing a synchronous timing for next control period.

Furthermore, the device comprises an operation control period timer which controls the operation period of the device itself, a comparing unit which compares the synchronous timing time of the periodic control indicated by the time stamp of the periodic transfer packet transmitted by the transmitting unit and the global time indicated by the second global timer, and a correcting unit which corrects the operation period timer by determining the time difference between the synchronous timing time of the periodic control indicated by the time stamp compared by the comparing unit and the global time indicated by the second global timer at the synchronous timing indicated by the operation period timer, and determines the timer correction value or timer period correction value of the operation period timer on the basis of the obtained time difference.

Thus, the correcting unit of the device corrects the operation period timer by determining the time difference between the synchronous timing time of the periodic control indicated by the time stamp compared by the comparing unit and the global time indicated by the second global timer at the synchronous timing indicated by the operation period timer, and determines the timer correction value or timer period correction value of the operation period timer on the basis of the obtained time difference.

Furthermore, the correcting unit comprises a detecting unit which detects whether the time difference is within a specified allowable range or not, and controls to correct the operation period timer on the basis of the timer correction value or timer period correction value when the time difference is within the specified allowable range, and not to correct the operation period timer when the time difference is out of the specified allowable range.

Thus, the detecting unit detects whether the time difference is within a specified allowable range or not, and the correcting unit controls to correct the operation period timer on the basis of the timer correction value or timer period correction value when the time difference is within the specified allowable range, and not to correct the operation period timer when the time difference is out of the specified allowable range, thereby avoiding wrong synchronous correction.

Furthermore, the device comprises an operation control period timer which controls the operation period of the device itself, a comparing unit which compares the synchronous timing time of the periodic control indicated by the time stamp of the periodic transfer packet transmitted by the transmitting unit and the global time indicated by the second global timer, and correcting unit for resetting the operation period timer when the global time indicated by the second global timer reaches the synchronous timing time of the periodic control indicated by the time stamp.

Thus, the comparing unit compares the synchronous timing time of the periodic control indicated by the time stamp of the periodic transfer packet transmitted by the transmitting unit and the global time indicated by the second global timer, and the correcting unit resets the operation period timer when the global time indicated by the second global timer reaches the synchronous timing time of the periodic control indicated by the time stamp.

Furthermore, the correcting unit resets the operation period timer when reaching the synchronous timing indicated by the operation period timer before the global time indicated by the second global timer reaches the synchronous timing time of the periodic control indicated by the time stamp, and resets the operation period timer again later when the synchronous timing time of the periodic control indicated by the time stamp reaches or exceeds the global time indicated by the second global timer.

Thus, the correcting unit resets the operation period timer when reaching the synchronous timing indicated by the operation period timer before the global time indicated by the second global timer reaches the synchronous timing time of the periodic control indicated by the time stamp, and resets the operation period timer again later when the synchronous timing time of the periodic control indicated by the time stamp reaches or exceeds the global time indicated by the second global timer, and therefore if the periodic transfer packet is lost, the operation period timer continues to clock the time.

Furthermore, the correcting unit comprises a detecting unit which detects whether the time difference between the synchronous timing time of the periodic control indicated by the time stamp compared by the comparing unit and the global time indicated by the second global timer at the synchronous timing indicated by the operation period timer is within a specified allowable range or not, and controls not to correct the operation period timer when the time difference is out of the specified allowable range.

Thus, the detecting unit detects whether the time difference between the synchronous timing time of the periodic control indicated by the time stamp compared by the comparing unit and the global time indicated by the second global timer at the synchronous timing indicated by the operation period timer is within a specified allowable range or not, and the correcting unit controls not to correct the operation period timer when the time difference is out of the specified allowable range, thereby avoiding wrong synchronous control.

Furthermore, the correcting unit determines the timer periodic correction value of the operation period timer by finding the value of the operation period timer at the synchronous timing of the periodic control indicated by the timestamp, or determines the timer periodic correction value of the operation period timer from the time difference between the synchronous timing time of the periodic control indicated by the time stamp and the global time indicated by the second global timer, and thereby corrects the operation period timer on the basis of the obtained timer periodic correction value.

Thus, the correcting unit determines the timer periodic correction value of the operation period timer by finding the value of the operation period timer at the synchronous timing of the periodic control indicated by the time stamp, or determines the timer periodic correction value of the operation period timer from the time difference between the synchronous timing time of the periodic control indicated by the time stamp and the global time indicated by the second global timer, and thereby corrects the operation period timer on the basis of the obtained timer periodic correction value, thereby correcting deviation of control period and operation period.

The periodic control synchronous system according to still another aspect of this invention performs synchronization of periodic control between controllers connected to first and networks, and one or more devices connected to the first network one or more devices connected to the second network. In this periodic control synchronous system, the controller comprises a first global timer controlled through the first network, a second global timer controlled through the second network, a control period timer which controls the control period of periodic control of this periodic control synchronous system, a time stamp providing unit which provides the periodic transfer packet transmitted periodically to the first and second networks with the time stamp showing the synchronous timing of the period control designated by the control period timer by using the global time indicated by the first and second global timers, first a transmitting unit which transmits the periodic transfer packet provided with the time stamp to one or more devices connected to the corresponding first network, and second a transmitting unit which transmits the periodic transfer packet provided with the time stamp to one or more devices connected to the corresponding second network, each one of one or more devices connected to the first and second networks comprises a third global timer controlled respectively through the first and second networks, and periodic control unit which synchronizes the operation period of the corresponding device with the control period by using the synchronous timing time of the periodic control indicated by the time stamp of the periodic transfer packet transmitted by the first and second transmitting unit and the global time indicated by the third global timer.

According to the above-mentioned aspect, the time stamp providing unit of the controller provides the periodic transfer packet transmitted periodically to the first and second networks with the time stamp showing the synchronous timing of the period control designated by the control period timer by using the global time indicated by the first and second global timers. Furthermore, the first and second transmitting unit transmit the periodic transfer packet provided with the time stamp to one or more devices connected to the corresponding first and second networks, and the periodic control unit of one or more devices connected to the first and second networks synchronize the operation period of the corresponding device with the control period by using the synchronous timing time of the periodic control indicated by the time stamp of the periodic transfer packet transmitted by the first and second transmitting unit and the global time indicated by the third global timer.

Furthermore, the periodic control synchronous system further comprises a first latch unit which latches the global time of the first global timer, and holds the latched time, and a second latch unit which latches the global time of the second global timer, and holds the latched time, the control period timer latches the global time of the first and second global timers in the first and second latch units at the synchronous timing of the periodic control designated by the control period timer, and the time stamp providing unit provides the periodic transfer packet with the time stamp having the global time latched by the first and second latch units offset by the portion of the control period.

Thus, the control period timer of the controller latches the global time of the first and second global timers in the first and second latch units at the synchronous timing of the periodic control designated by the control period timer, and the time stamp providing unit provides the periodic transfer packet with the time stamp having the global time latched by the first and second latch units offset by the portion of the control period, and therefore the synchronous timing for next control period is instructed to the devices connected to the first and second networks.

Other objects and features of this invention will become apparent from the following description with reference to the accompanying drawings.

DESCRIPTION OF THE PREFERRED EMBODIMENTS

Preferred embodiments of the periodic control synchronous system of this invention are described in detail below with reference to the accompanying drawings.

Figure 1:
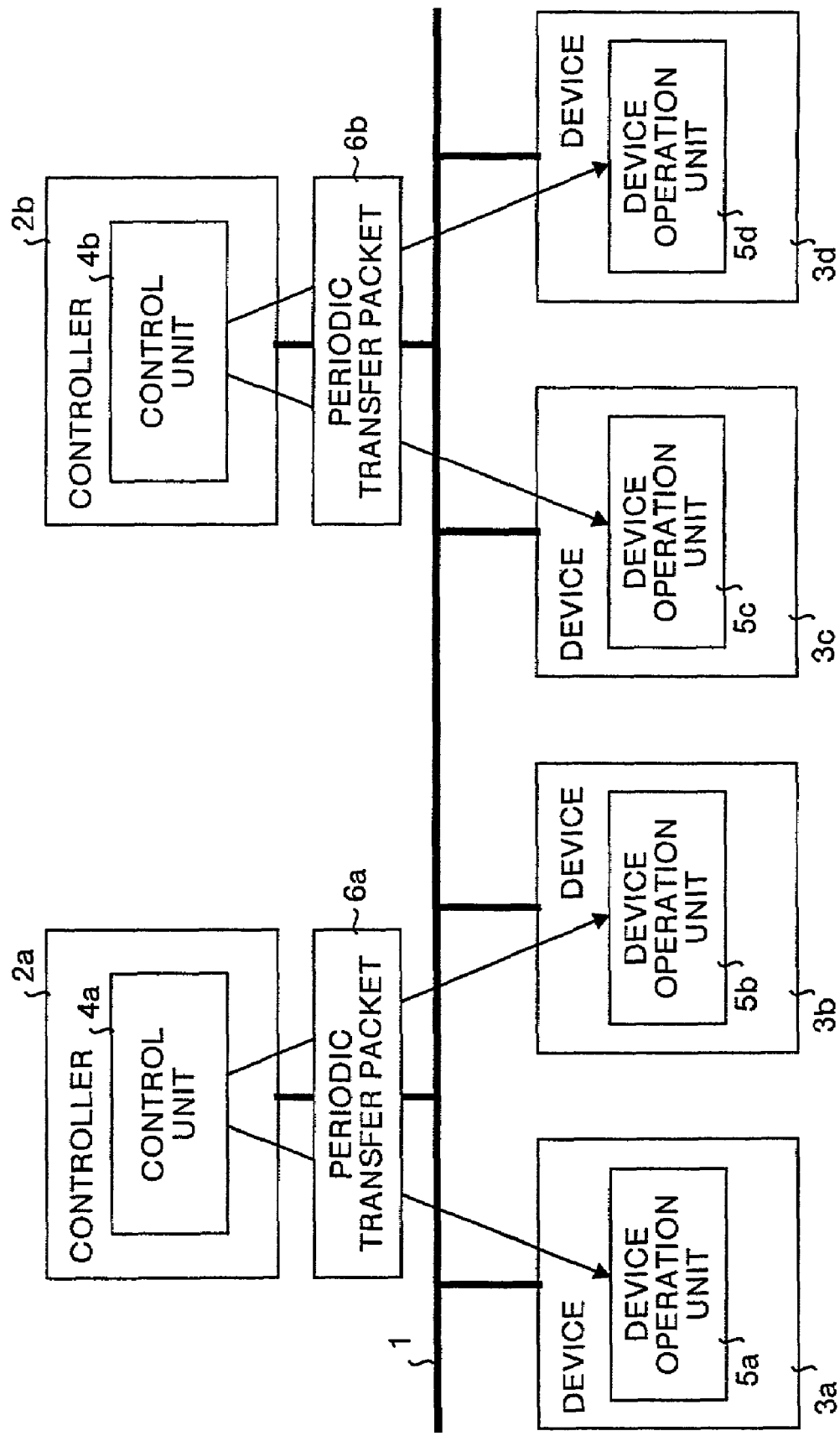
FIG. 1 is a block diagram of outline of a periodic control synchronous system in a first embodiment of the invention.

FIG. 1 is a block diagram showing an entire configuration of periodic control synchronous system in a first embodiment of the invention. In FIG. 1, controllers 2a, 2b and devices 3a to 3d are connected to a network 1. The controller 2a controls the devices 3a and 3b, and the controller 2b controls the devices 3c and 3d. Further plural controllers and devices can be also connected to the network 1. When an extra controller is added for controlling the devices 3a and 3b, either the extra controller or the controller 2a controls the devices 3a and 3b.

The controllers 2a, 2b transmit periodic transfer packets 6a, 6b comprising each periodic control command to the devices 3a, 3b and the devices 3c, 3d, respectively. Device operation units 5a, 5b of the devices 3a, 3b, and device operation units 5c, 5d of the devices 3c, 3d perform periodic control of operation of each device on the basis of the transmitted periodic transfer packets 6a, 6b.

Figure 2:
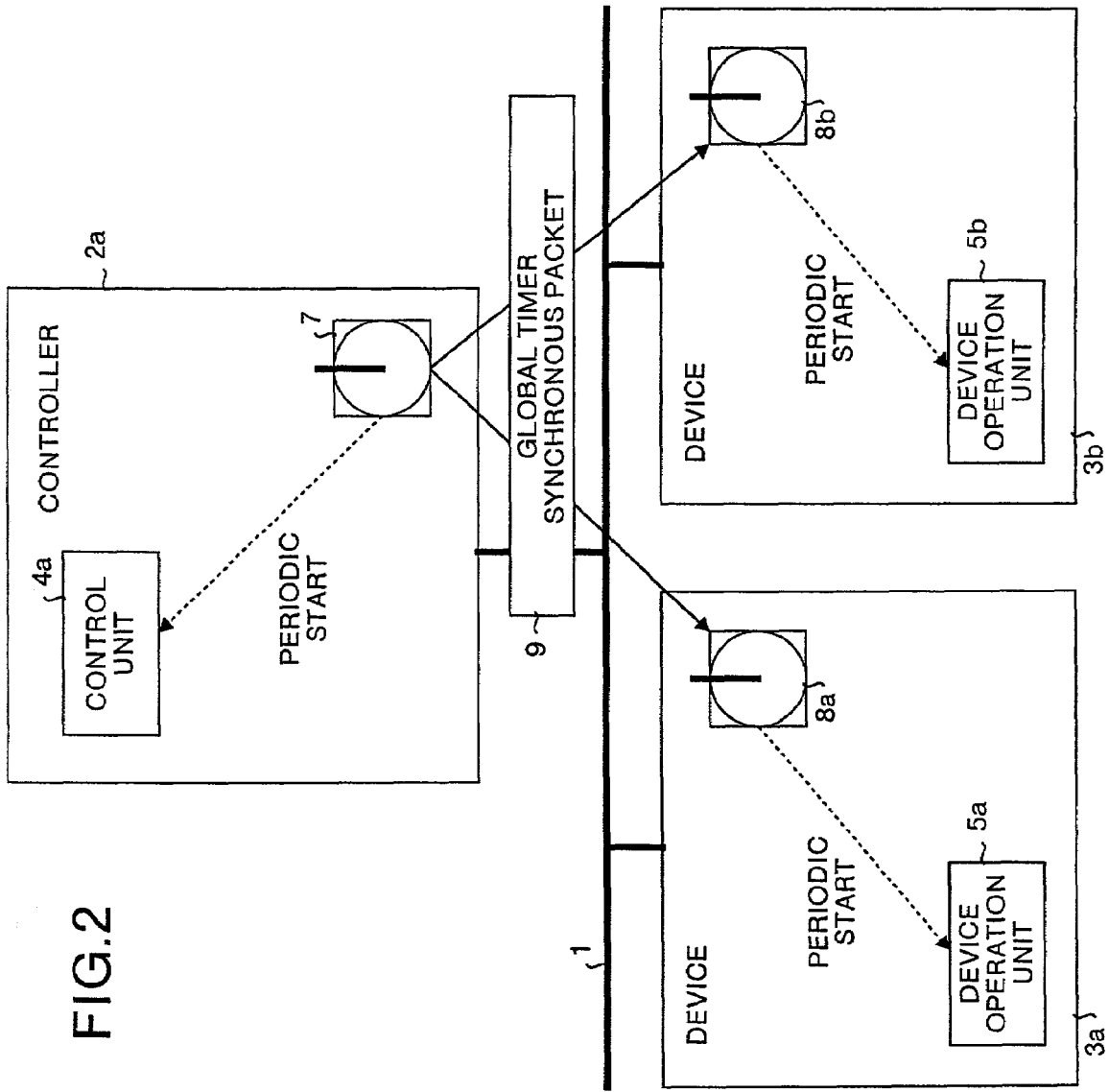
FIG. 2 is a block diagram showing periodic control relation of controller and device when a master global timer is set in the controller shown in FIG. 1.

In FIG. 1, two control systems consisting of the controller 2a and devices 3a, 3b, and the controller 2b and devices 3c, 3d are connected to one network, but the controller and devices of each periodic control system, for example, the controller 2a and devices 3a, 3b may be formed as shown in FIG. 2, in which synchronous (system sync) timing of periodic control is generated by using the global. time indicated by global timers 7, 8a, 8b, and the period (control period) of the control unit of the controller 2a, and the period (operation period) of the device operation units 5a, 5b of the devices 3a, 3b are synchronized with the system sync. As a result, periodic control is realized in which the control period of the controller 2a and the operation period of the devices 3a, 3b operate in the same period.

As shown in FIG. 2, using the global time presented by the global timers 7, 8a, 8b, periodic control of control period of the controller 2a and operation period of the devices 3a, 3b is executed, and therefore, unlike the prior art, it is not necessary to synchronize the periodic control by the periodic transfer timing of the periodic packet, and the precision of periodic transfer of periodic packet has no relation with the precision of synchronism of periodic control, so that flexible communication such as packet transfer of large size or asynchronous communication between slaves (devices 3a, 3b) is realized while maintaining the precision of synchronism of periodic control.

The global timers comprise one master global timer as the reference of global time of each network, and other slave global timers. In FIG. 2, the global timer 7 of the controller 2a is set in the master global timer, and the global timers 8a, 8b of the devices 3a, 3b are set in the slave global timers. The node (controller 2a) having the global timer 7 which is the master global timer transmits a global timer synchronous packet 9 setting the master global time to the network 1, and the nodes (devices 3a, 3b) having the global timers 8a, 8b which are slave global timers take out the global time of the global timer 7 which is the master global timer, from the received global timer periodic packet 9, and set in the global timers 8a, 8b which are slave global timers. As a result, the global timers 8a, 8b which are slave global timers are periodically synchronized with the global timer 7 which is the master global time.

Accordingly, the control period of the controller 2a is not required to be synchronized because the global timer 7 is the master global timer, and it is free from time fluctuation, so that the precision of designation of the time by using the global timer 7 can be maintained. Further, the controller 2a can designated the synchronous timing of the global timers 8a, 8b which are slave global timers of all devices 3a, 3b, the global timers 8a, 8b which are slave global timers of the devices 3a, 3b can be synchronized at an appropriate timing for the device operation units 5a, 5b of the devices 3a, 3b, so that the precision of designation of the time can be maintained.

Figure 3:
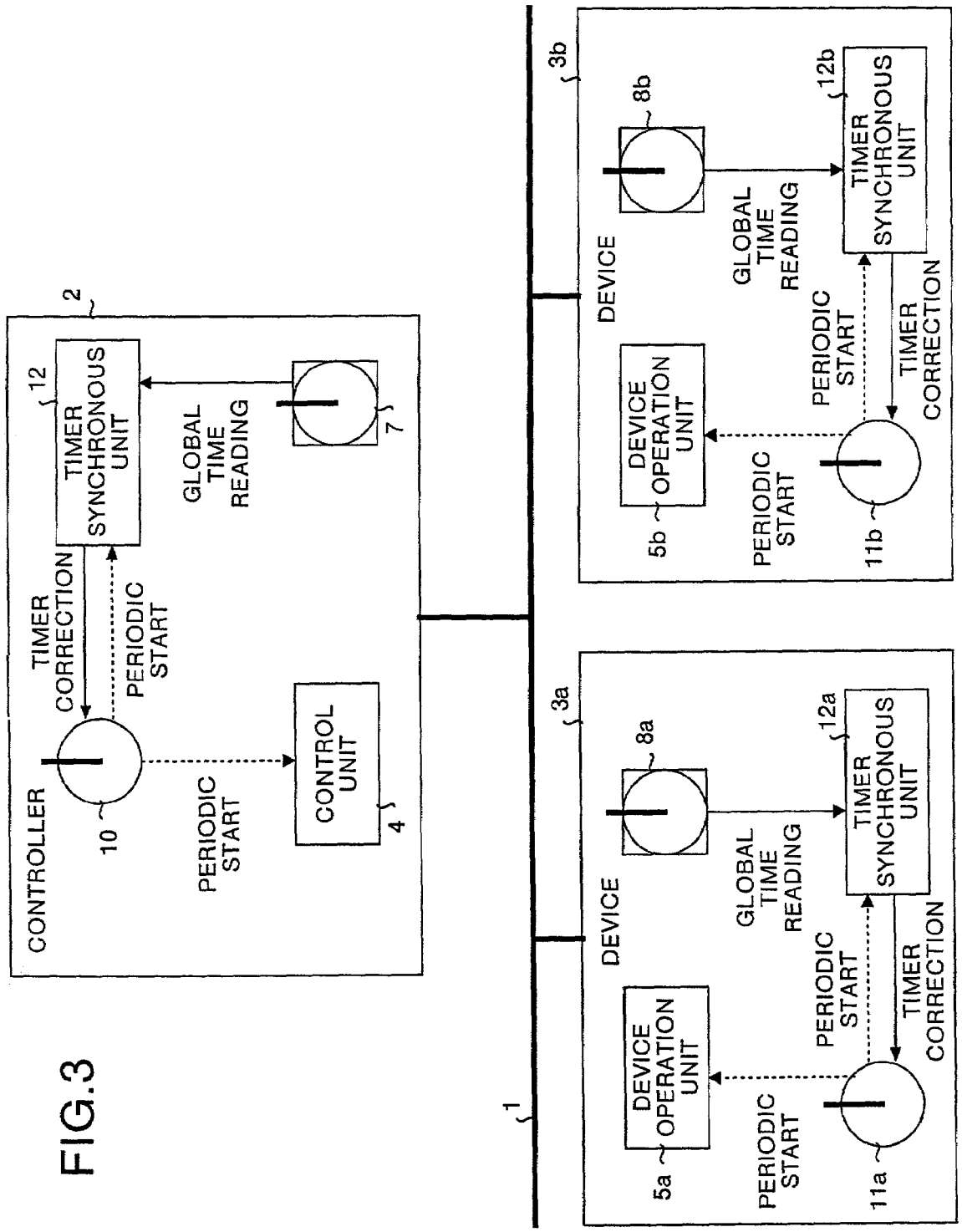
FIG. 3 is a block diagram of a periodic control synchronous system in a second embodiment of the invention.

Next, a second embodiment of the invention is explained. FIG. 3 is a block diagram of configuration of periodic control synchronous system in the second embodiment of the invention. In FIG. 3, a controller 2 comprises a global timer 7, a control unit 4, a control period timer 10 for periodically starting the control unit 4, and a timer synchronous unit 12 for synchronizing the control period timer 10 with the global timer 7. Devices 3a, 3b comprise global timers 8a, 8b, device operation units 5a, 5b, operation period timers 11a, 11b for periodically starting the device operation units 5a, 5b, and timer synchronous units 12a, 12b which synchronizes the operation period timers 11a, 11b with the global timers 8a, 8b.

The timer synchronous unit 12 of the controller 2 determines the correction value of the control period timer 10 from the time difference between the time indicated by the global timer 7 and the synchronous (system sync) time of periodic control, at the synchronous (local sync) timing indicated by the control period timer 10, and sets in the control period timer 10. Therefore, the control period timer 10 can be updated at an appropriate timing for the control unit 4, and the precision of designation of the time using the control period timer 10 can be maintained without having effects of time fluctuation due to mutual time synchronism of the global timers 7, 8a, 8b occurring at an arbitrary timing.

On the other hand, the timer synchronous units 12a, 12b of the devices 3a, 3b determine the correction values of the operation period timers 11a, 11b from the time difference between the time indicated by the global timers 8a, 8b and the synchronous (system sync) time of periodic control, at the synchronous (local sync) timing indicated by the operation period timers 11a, 11b, and set in the operation period timers 11a, 11b. Therefore, the operation period timers 11a, 11b can be updated at an appropriate timing for the device operation units 5a, 5b, and the precision of designation of the time using the operation period timers 11a, 11b can be maintained without having effects of time fluctuation due to mutual time synchronism of the global timers 7, 8a, 8b occurring at an arbitrary timing.

Figure 4:
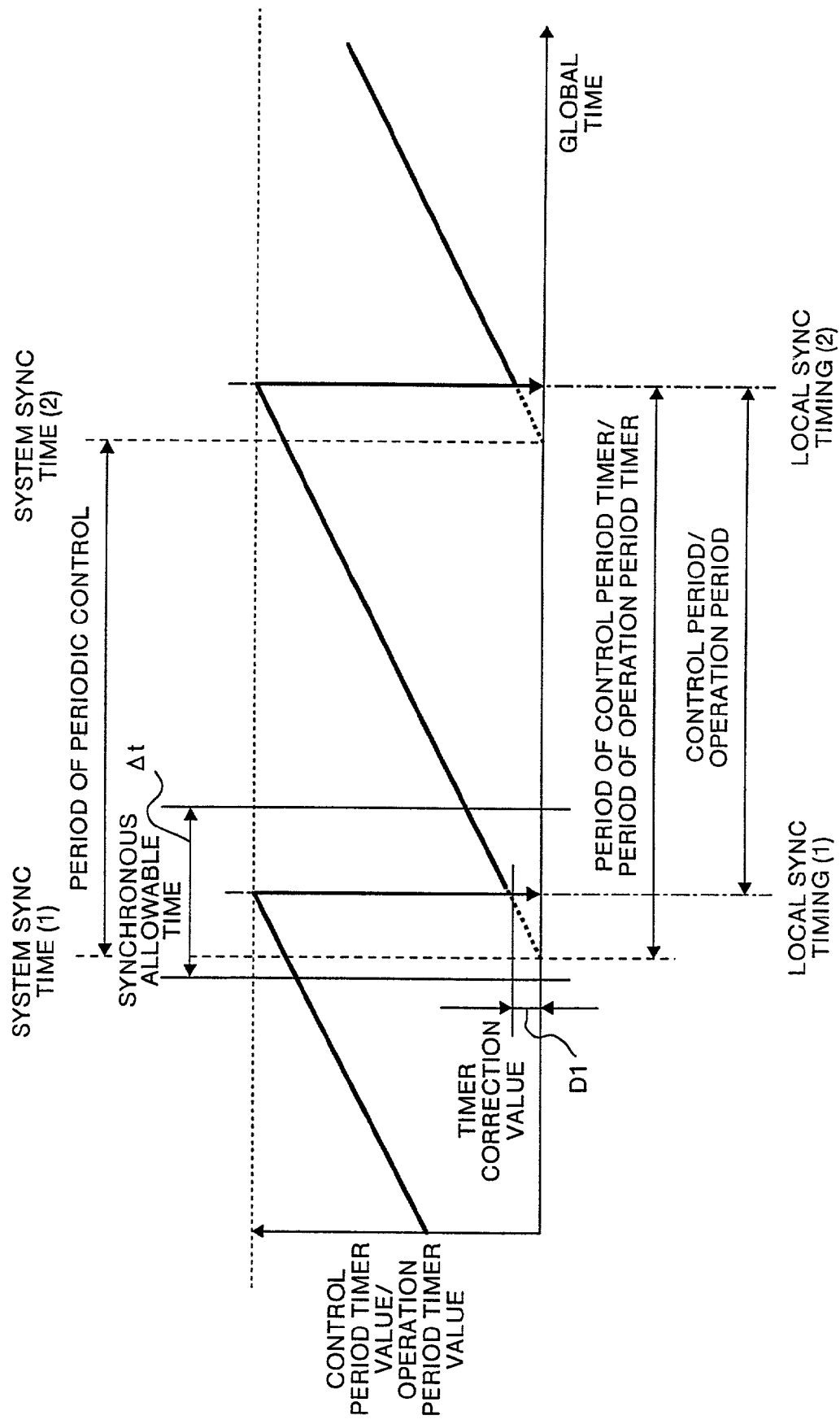
FIG. 4 is a timing chart showing timer correction when the period of the control period timer or the operation period timer shown in FIG. 3 is longer than the period of periodic control.

Herein, referring to the timing charts shown in FIG. 4 to FIG. 8, the timer correction process on the control period timer 10 or operation period timers 11a, 11b by the timer synchronous units 12, 12a, 12b is explained. FIG. 4 shows the timer correction process of the control period timer 10 or operation period timers 11a, 11b, in terms of the global time, when the period of the control period timer 10 or operation period timers 11a, 11b is longer than the period of the periodic control indicated by the global timers 7, 8a, 8b. The timer synchronous unit 12 or timer synchronous units 12a, 12b calculate timer correction value D1 of the control period timer 10 or operation period timers 11a, 11b, from the time difference between the global time of the global timers 7, 8a, 8b at the local sync timing of the control period timer 10 or operation period timers 11a, 11b, and the synchronous (system sync) time of periodic control, and set this timer correction value D1 in the control period timer 10 or operation period timers 11a, 11b. As a result, time deviation between the period of periodic control and the control period timer 10 or operation period timers 11a, 11b is corrected, and the control period or operation period coincides with the period of periodic control.

Figure 5:
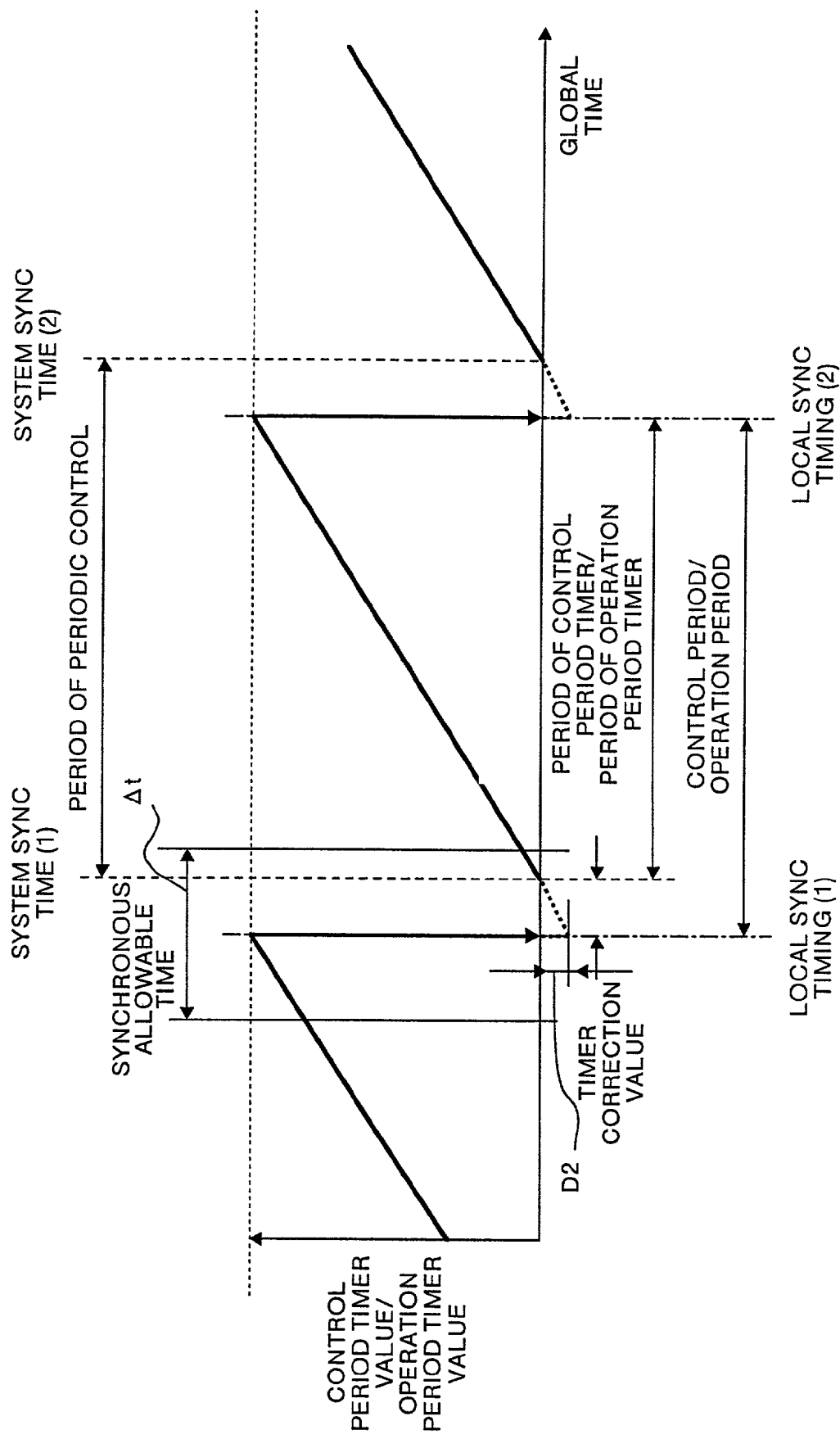
FIG. 5 is a timing chart showing timer correction when the period of the control period timer or the operation period timer shown in FIG. 3 is shorter than the period of periodic control.

FIG. 5 shows an example of the timer correction process of the control period timer 10 or operation period timers 11a, 11b, in terms of the global time, when the period of the control period timer 10 or operation period timers 11a, 11b is shorter than the period of the periodic control indicated by the global timers 7, 8a, 8b. The timer synchronous unit 12 or timer synchronous units 12a, 12b calculate timer correction value D2 of the control period timer 10 or operation period timers 11a, 11b, from the time difference between the global time of the global timers 7, 8a, 8b at the local sync timing of the control period timer 10 or operation period timers 11a, 11b, and the synchronous (system sync) time of periodic control, and set this timer correction value D2 in the control period timer 10 or operation period timers 11a, 11b. As a result, time deviation between the period of periodic control and the control period timer 10 or operation period timers 11a, 11b is corrected, and the control period or operation period coincides with the period of periodic control. Herein, since the period of the control period timer 10 or operation period timers 11a, 11b is shorter than the period of the periodic control indicated by the global timers 7, 8a, 8b, the timer correction value D2 is a negative value. When the control period timer 10 or operation period timers 11a, 11b are realized by period counters, it is necessary to process so as not to synchronize when the timer value of the period counter becomes zero.

Figure 6:
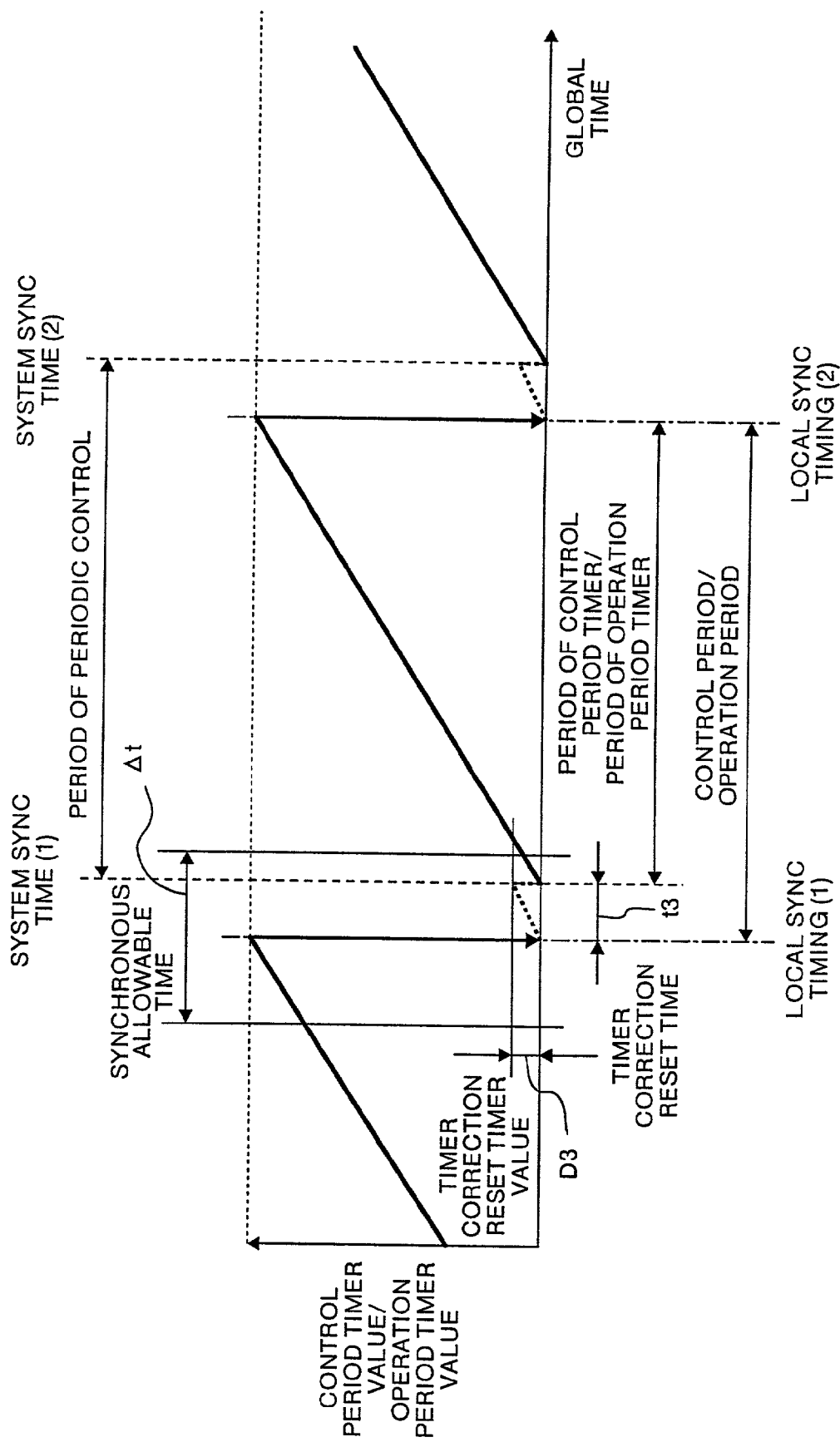
FIG. 6 is a timing chart showing another timer correction when the period of the control period timer or the operation period timer shown in FIG. 3 is shorter than the period of periodic control.

FIG. 6 shows other example of the timer correction process of the control period timer 10 or operation period timers 11a, 11b, in terms of the global time, when the period of the control period timer 10 or operation period timers 11a, 11b is shorter than the period of the periodic control indicated by the global timers 7, 8a, 8b. The timer synchronous unit 12 or timer synchronous units 12a, 12b calculate timer correction reset timer value D3 of the control period timer 10 or operation period timers 11a, 11b, from the time difference between the global time of the global timers 7, 8a, 8b at the local sync timing of the control period timer 10 or operation period timers 11a, 11b, and the synchronous (system sync) time of periodic control, and reset the control period timer 10 or operation period timers 11a, 11b when the control period timer 10 or operation period timers 11a, 11b reach this timer correction reset timer value D3. As a result, time deviation between the period of periodic control and the control period timer 10 or operation period timers 11a, 11b is corrected, and the control period or operation period coincides with the period of periodic control. Herein, the value of the timer correction reset timer value D3 is same as the timer correction value D2 in the absolute value, but is different in the polarity. At the time of resetting when reaching the timer correction timer value D3, it is necessary to process so as not to synchronize the control period timer 10 or operation period timers 11a, 11b.

Also in FIG. 6, the timer synchronous units 12, 12a, 12b calculate timer correction reset time t3 of the control period timer 10 or operation period timers 11a, 11b, from the time difference between the global time of the global timers 7, 8a, 8b at the local sync timing of the control period timer 10 or operation period timers 11a, 11b, and the synchronous (system sync) time of periodic control, and reset the control period timer 10 or operation period timers 11a, 11b when reaching this timer correction reset time t3. Alternatively, for the timer correction reset time t3, the control period timer 10 or operation period timers 11*a*, 11*b* are stopped. As a result, time deviation between the period of periodic control and the control period timer 10 or operation period timers 11*a*, 11*b* is corrected, and the control period or operation period coincides with the period of periodic control.

Figure 7:
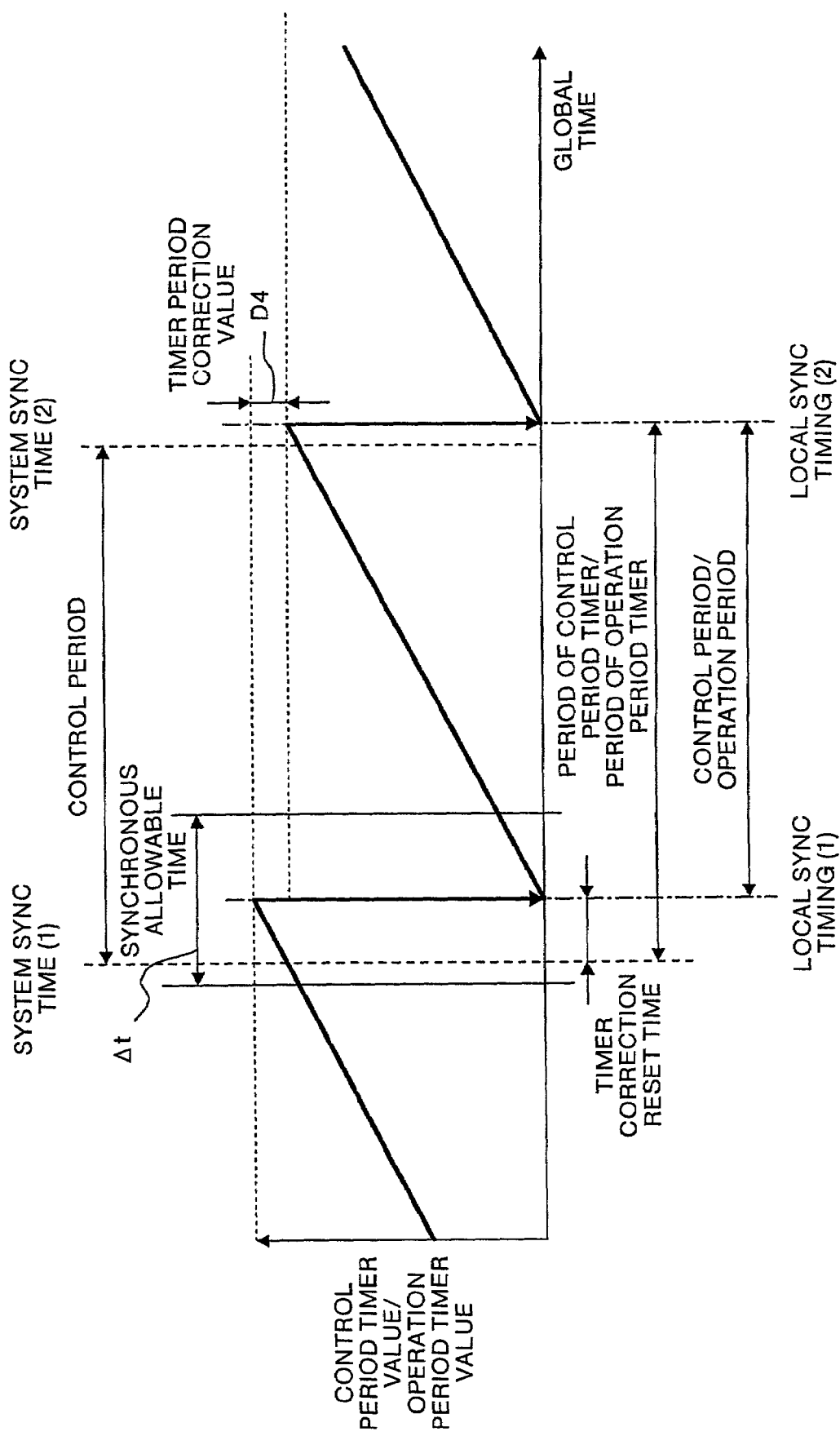
FIG. 7 is a timing chart showing timer period correction when the period of the control period timer or the operation period timer shown in FIG. 3 is longer than the period of periodic control.

FIG. 7 shows the timer period correction process of the control period timer 10 or operation period timers 11*a*, 11*b*, in terms of the global time, when the period of the control period timer 10 or operation period timers 11*a*, 11*b* is longer than the period of the periodic control indicated by the global timers 7, 8*a*, 8*b*. The timer synchronous unit 12 or timer synchronous units 12*a*, 12*b* calculate timer period correction reset timer value D4 of the control period timer 10 or operation period timers 11*a*, 11*b*, from the time difference between the global time of the global timers 7, 8*a*, 8*b* at the local sync timing of the control period timer 10 or operation period timers 11*a*, 11*b*, and the synchronous (system sync) time of periodic control, and correct the timer period of the control period timer 10 or operation period timers 11*a*, 11*b*. As a result, time deviation between the period of periodic control and the control period timer 10 or operation period timers 11*a*, 11*b* is corrected, and the control period or operation period coincides with the period of periodic control.

Figure 8:
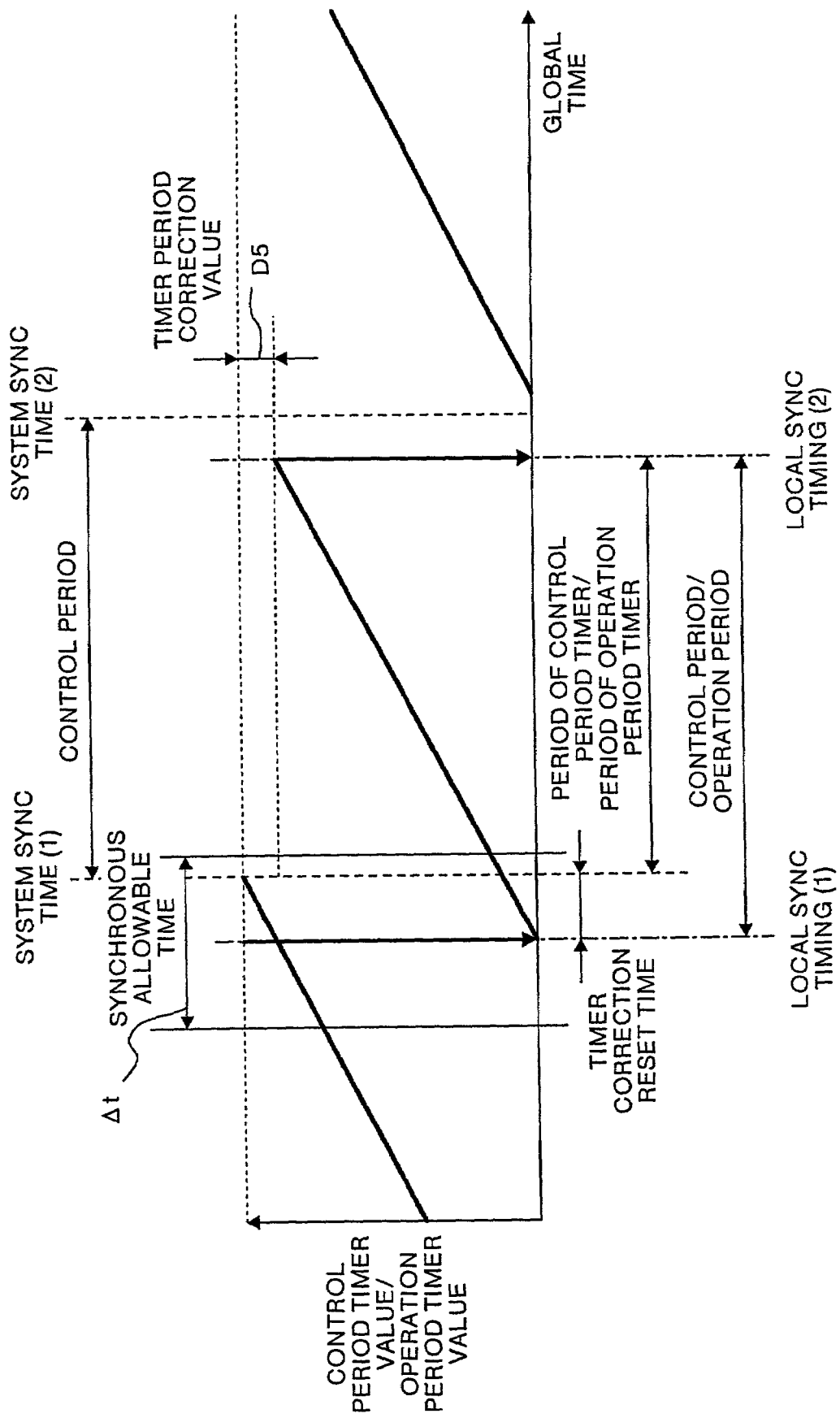
FIG. 8 is a timing chart showing timer period correction when the period of the control period timer or the operation period timer shown in FIG. 3 is shorter than the period of periodic control.

FIG. 8 shows the timer period correction process of the control period timer 10 or operation period timers 11*a*, 11*b*, in terms of the global time, when the period of the control period timer 10 or operation period timers 11*a*, 11*b* is shorter than the period of the periodic control indicated by the global timers 7, 8*a*, 8*b*. The timer synchronous unit 12 or timer synchronous units 12*a*, 12*b* calculate timer period correction reset timer value D5 of the control period timer 10 or operation period timers 11*a*, 11*b*, from the time difference between the global time of the global timers 7, 8*a*, 8*b* at the local sync timing of the control period timer 10 or operation period timers 11*a*, 11*b*, and the synchronous (system sync) time of periodic control, and correct the timer period of the control period timer 10 or operation period timers 11*a*, 11*b*. As a result, time deviation between the period of periodic control and the control period timer 10 or operation period timers 11*a*, 11*b* is corrected, and the control period or operation period coincides with the period of periodic control.

In all cases of timer correction process and timer period correction process shown in FIG. 4 to FIG. 8, at the synchronous (local sync) timing indicated by the control period timer 10 or operation period timers 11*a*, 11*b*, if the time difference between the global time of the global timers 7, 8*a*, 8*b* and the synchronous (system sync) time of periodic control is not within the synchronous allowable range $\Delta t$, it is recognized that unjust synchronism or stopping of global timers 7, 8*a*, 8*b* has occurred due to trouble of network 1 of the like, and the timer correction or timer period correction of control period timer 10 or operation period timers 11*a*, 11*b* is not executed. Accordingly, the control period timer 10 or operation period timers 11*a*, 11*b* continue to clock the time, and sudden stop or runaway of the control period timer 10 or operation period timers 11*a*, 11*b* can be prevented.

Further, at the synchronous (local sync) timing indicated by the control period timer 10 or operation period timers 11*a*, 11*b*, if the time difference between the global time of the global timers 7, 8*a*, 8*b* and the synchronous (system sync) time of periodic control does not return within the synchronous allowable range $\Delta t$, the controller 2 interrupts the periodic control, and forces to synchronize so as not to check synchronous allowable range $\Delta t$ of the control period timer 10 or operation period timers 11*a*, 11*b*, and the global timers 7, 8*a*, 8*b*.

Figure 9:
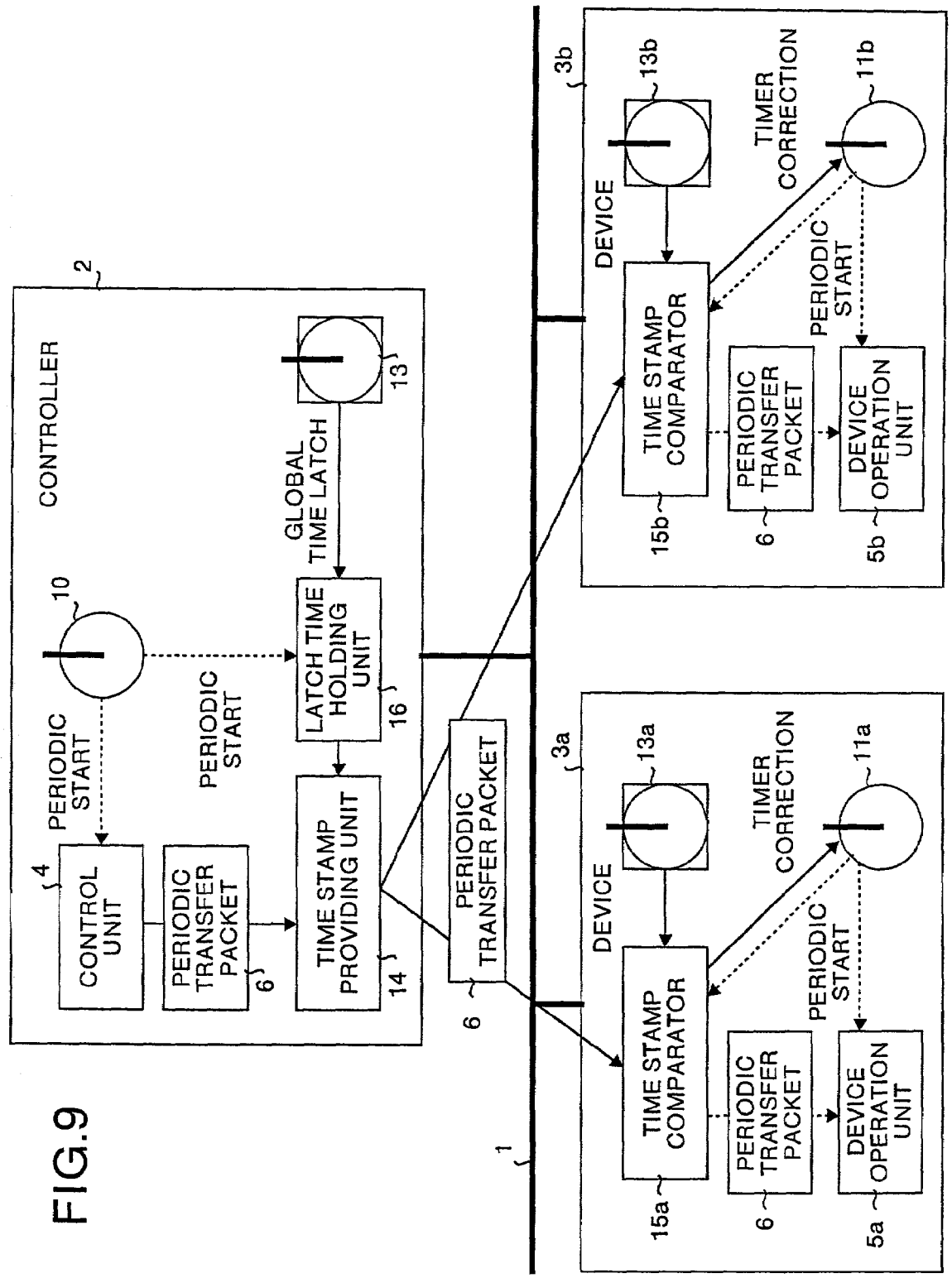
FIG. 9 is a block diagram of a periodic control synchronous system in a third embodiment of the invention.

Now, a third embodiment of the invention is explained. FIG. 9 is a block diagram of configuration of periodic control synchronous system in the third embodiment of the invention. In FIG. 9, a controller 2 comprises a global timer 13, a control unit 4, a control period timer 10 for periodically starting the control unit 4, a latch time holding unit 16 for latching the global timer 13 at an arbitrary timing and holds the latched time, and a time stamp providing unit 14 for providing the periodic transfer packet 6 periodically transmitted by the control unit 4 to the devices 3*a*, 3*b* with a time stamp designated in the global timer time.

On the other hand, the devices 3*a*, 3*b* comprise global timers 13*a*, 13*b*, device operation units 5*a*, 5*b*, operation period timers 11*a*, 11*b* for periodically starting the device operation units 5*a*, 5*b*, and time stamp comparators 15*a*, 15*b* for comparing the time indicated by the global timers 13*a*, 13*b* and the time indicated by the time stamp attached to the received periodic transfer packet 6.

Figure 10:
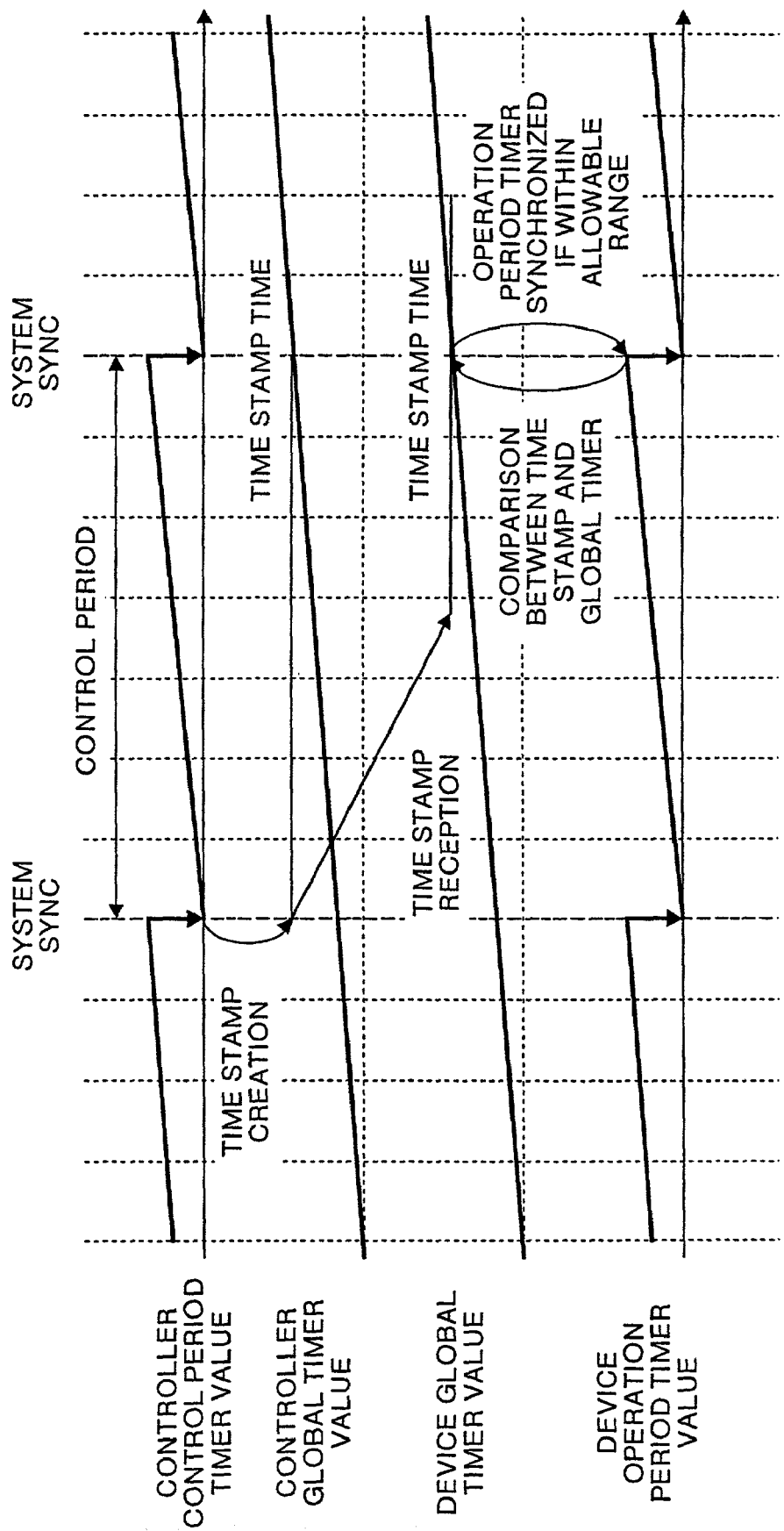
FIG. 10 is a timing chart showing synchronous a process of local sync timing using a time stamp.

FIG. 10 is a timing chart showing synchronous processing of local sync timing using the time stamp. In FIG. 10, the latch time holding unit 16 of the controller 2 latches the global timer 13 at the synchronous (system sync) timing of periodic control designated by the control period timer 10. The time stamp providing unit 14 provides the periodic transfer packet 6 having the latched time offset by the portion of the control period, and transmits to the devices 3*a*, 3*b*.

The time stamp comparators 15*a*, 15*b* of the devices 3*a*, 3*b* determine the timer correction value or timer period correction value of the operation period timers 11*a*, 11*b*, from the time difference between the (system sync) time indicated by the time stamp attached to the periodic transfer packet 6 received at the synchronous (local sync) timing indicated by the operation period timers 11*a*, 11*b*, and the time indicated by the global timers 13*a*, 13*b* of the devices 3*a*, 3*b*, and set the obtained timer correction value or timer period correction time in the operation period timers 11*a*, 11*b*. As a result, the operation period timers 11*a*, 11*b* of the devices 3*a*, 3*b* are synchronized with the control period timer 10 of the controller 2, so that the control unit 4 of the controller 2 and the device operation units 5*a*, 5*b* of the devices 3*a*, 3*b* are controlled synchronously.

The control period timer 10 of the controller 2 is realized by a simple counter cycling in control period, and the control period timer 10 periodically starts up the control unit. The control period timer 10 is the reference of periodic control, and the precision of control period is maintained the mutual time synchronism of the global timers 13, 13*a*, 13*b*, regardless of fluctuation in the global time of the global timers 13, 13*a*, 13*b*.

Moreover, at the system sync designated by the control period timer 10 of the controller 2, the operation period timers 11*a*, 11*b* of the devices 3*a*, 3*b* can be synchronized simultaneously. Further, the latch time holding unit 16 can calculate the time stamp showing the accurate system sync time.

Besides, since the local sync timing of the controller 2 can be easily generated by the timer interruption of the control period timer 10, the time stamp calculation and time stamp writing into the periodic transfer packet 6 can be processed by the software.

Still more, since the local sync timing of the devices 3*a*, 3*b* can be easily generated by the timer interruption of the operation period timers 11a, 11b, comparison between the timer stamp and global time can be processed by the software.

If the global time is deviated due to generation of reset of global timers 13, 13a, 13b due to restructuring of the network 1 or the like, as far as the global timers 13, 13a, 13b of the controller 2 and the devices 3a, 3g are synchronized again, the time stamp can be generated in the global time after re-synchronization, and therefore the control period can be maintained after resetting and continuous control is realized.

Figure 11:
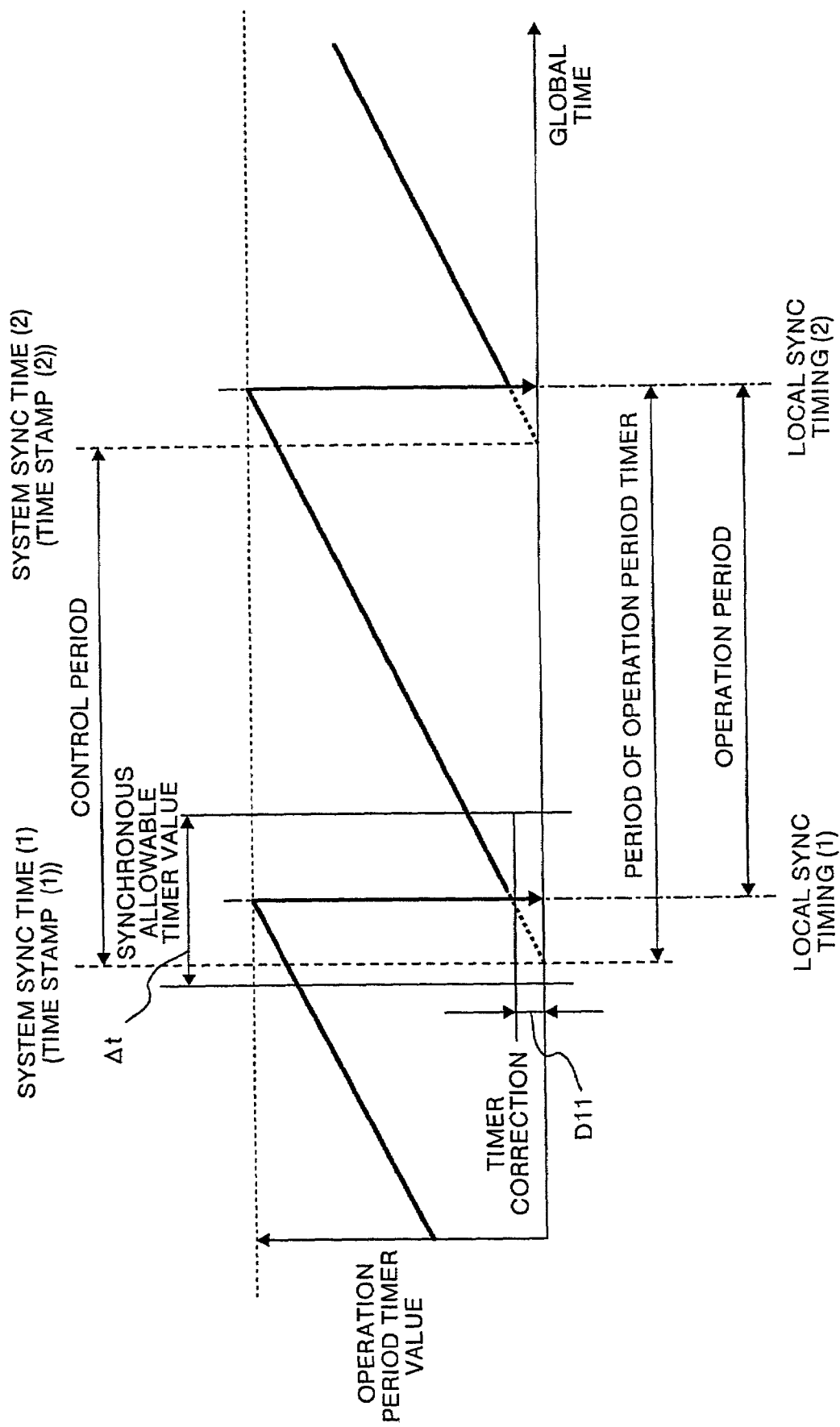
FIG. 11 is a timing chart showing timer correction when the period of the operation period timer shown in FIG. 10 is longer than the control period.

FIG. 11 is a timing chart of the timer correction process of the operation period timers 11a, 11b, in terms of the global time, when the period of the operation period timers 11a, 11b is longer than the control period indicated by the control period timer 10. In FIG. 11, the time stamp comparators 15a, 15b calculate timer correction value D11 of the operation period timers 11a, 11b, from the time difference between the global time of the global timers 13a, 13b at the local sync timing of the operation period timers 11a, 11b, and the synchronous (system sync) time indicated by the time stamp attached to the received periodic transfer packet 6, and set this timer correction value D11 in the operation period timers 11a, 11b. As a result, time deviation between the control period indicated by the control period timer 10, and the operation period timers 11a, 11b is corrected, and the operation period can be matched with the control period.

Figure 12:
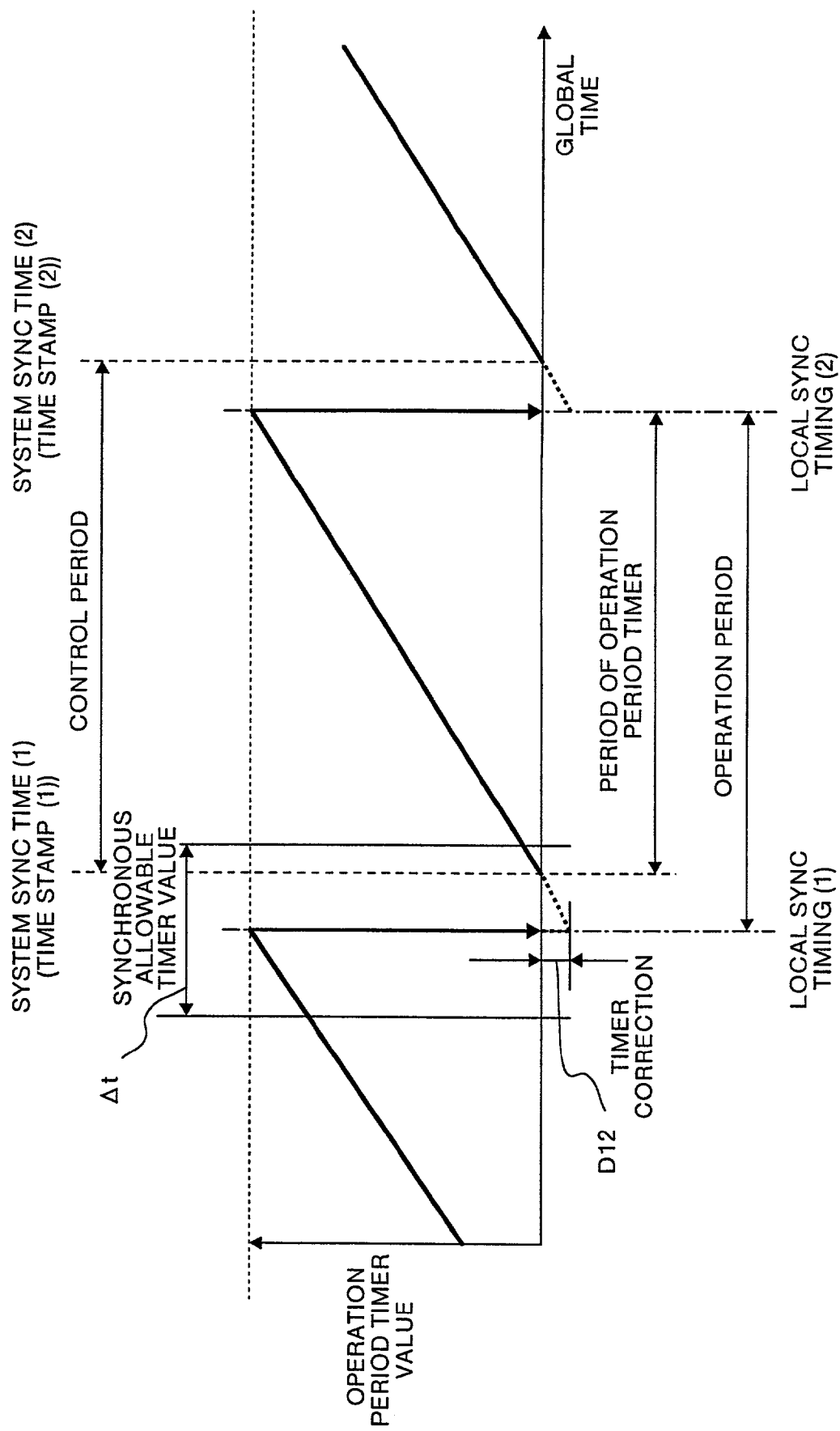
FIG. 12 is a timing chart showing timer correction when the period of the operation period timer shown in FIG. 10 is shorter than the control period.

FIG. 12 is a timing chart of an example of the timer correction process of the operation period timers 11a, 11b, in terms of the global time, when the period of the operation period timers 11a, 11b is shorter than the control period indicated by the control period timer 10. In FIG. 12, the time stamp comparators 15a, 15b calculate timer correction value D12 of the control period timer, from the time difference between the global time of the global timers 13a, 13b at the local sync timing of the operation period timers 11a, 11b, and the synchronous (system sync) time indicated by the time stamp attached to the received periodic transfer packet 6, and set this timer correction value D12 in the operation period timers 11a, 11b. As a result, time deviation between the control period indicated by the control period timer 10, and the operation period timers 11a, 11b is corrected, and the operation period can be matched with the control period. Herein, since the period of the operation period timers 11a, 11b is shorter than the control period indicated by the control period timer 10, the timer correction value D12 is a negative value, and when the operation period timers 11a, 11b are realized by period counters, it is necessary to process so as not to synchronize when the timer value becomes zero.

Figure 13:
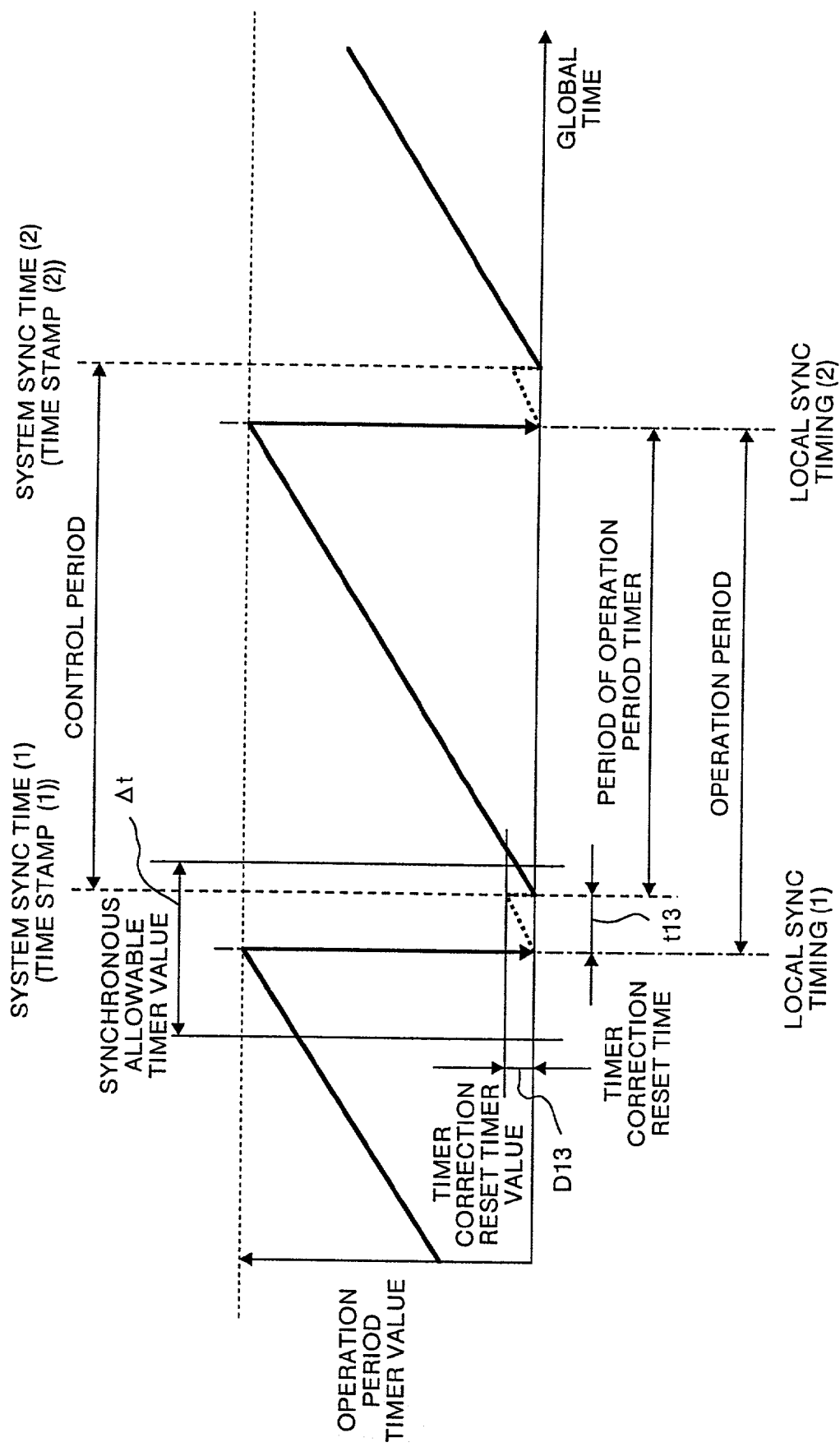
FIG. 13 is a timing chart showing another timer correction when the period of the operation period timer shown in FIG. 10 is shorter than the control period.

FIG. 13 is a timing chart of other example of the timer correction process of the operation period timers 11a, 11b, in terms of the global time, when the period of the operation period timers 11a, 11b is shorter than the control period indicated by the control period timer 10. In FIG. 13, the time stamp comparators 15a, 15b calculate timer correction reset timer value D13 of the operation period timers 11a, 11b, from the time difference between the global time of the global timers 13a, 13b at the local sync timing of the operation period timers 11a, 11b, and the synchronous (system sync) time indicated by the time stamp attached to the received periodic transfer packet 6, and reset the operation period timers 11a, 11b when the operation period timers 11a, 11b reach this time correction reset timer value. As a result, time deviation between the control period indicated by the control period timer 10, and the operation period timers 11a, 11b is corrected, and the operation period can be matched with the control period. Herein, it is necessary to process so as not to synchronize at the time of resetting for timer correction.

Alternatively, the time stamp comparators 15a, 15b calculate timer correction reset time t13 of the or operation period timers 11a, 11b, from the time difference between the global time of the global timers 13a, 13b at the local sync timing of the operation period timers 11a, 11b, and the synchronous (system sync) time indicated by the time stamp attached to the received periodic transfer packet 6, and reset the or operation period timers 11a, 11b at this timer correction reset time t13. Alternatively, for the timer correction reset time t13, the operation period timers 11a, 11b are stopped. As a result, time deviation of the operation period timers 11a, 11b is corrected, and the operation period can be matched with the control period.

Figure 14:
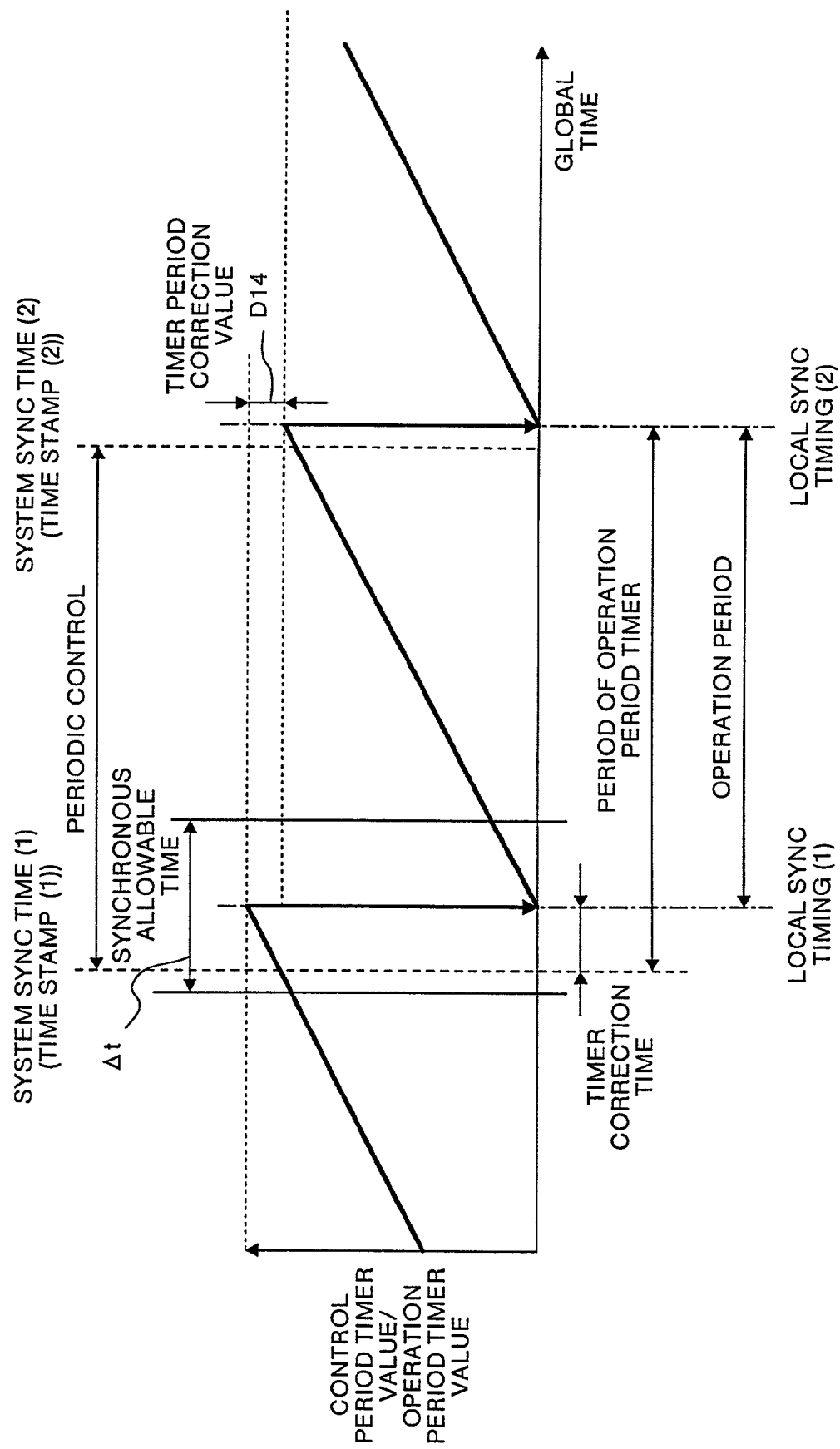
FIG. 14 is a timing chart showing timer period correction when the period of the control period timer or the operation period timer shown in FIG. 10 is longer than the period of periodic control.

FIG. 14 shows the timer period correction process of the control period timer 10 or operation period timers 11a, 11b, in terms of the global time, when the period of the control period timer 10 or operation period timers 11a, 11b is longer than the period of the periodic control indicated by the global timers 13, 13a, 13b. The time stamp comparators 15a, 15b calculate timer period correction reset timer value D14 of the operation period timers 11a, 11b, from the time difference between the global time of the global timers 13a, 13b at the local sync timing of the operation period timers 11a, 11b, and the synchronous (system sync) time indicated by the time stamp attached to the received periodic transfer packet 6, and correct the timer period of the operation period timers 11a, 11b. As a result, time deviation between the control period indicated by the control period timer 10, and the operation period timers 11a, 11b is corrected, and the operation period is matched with the control period.

Figure 15:
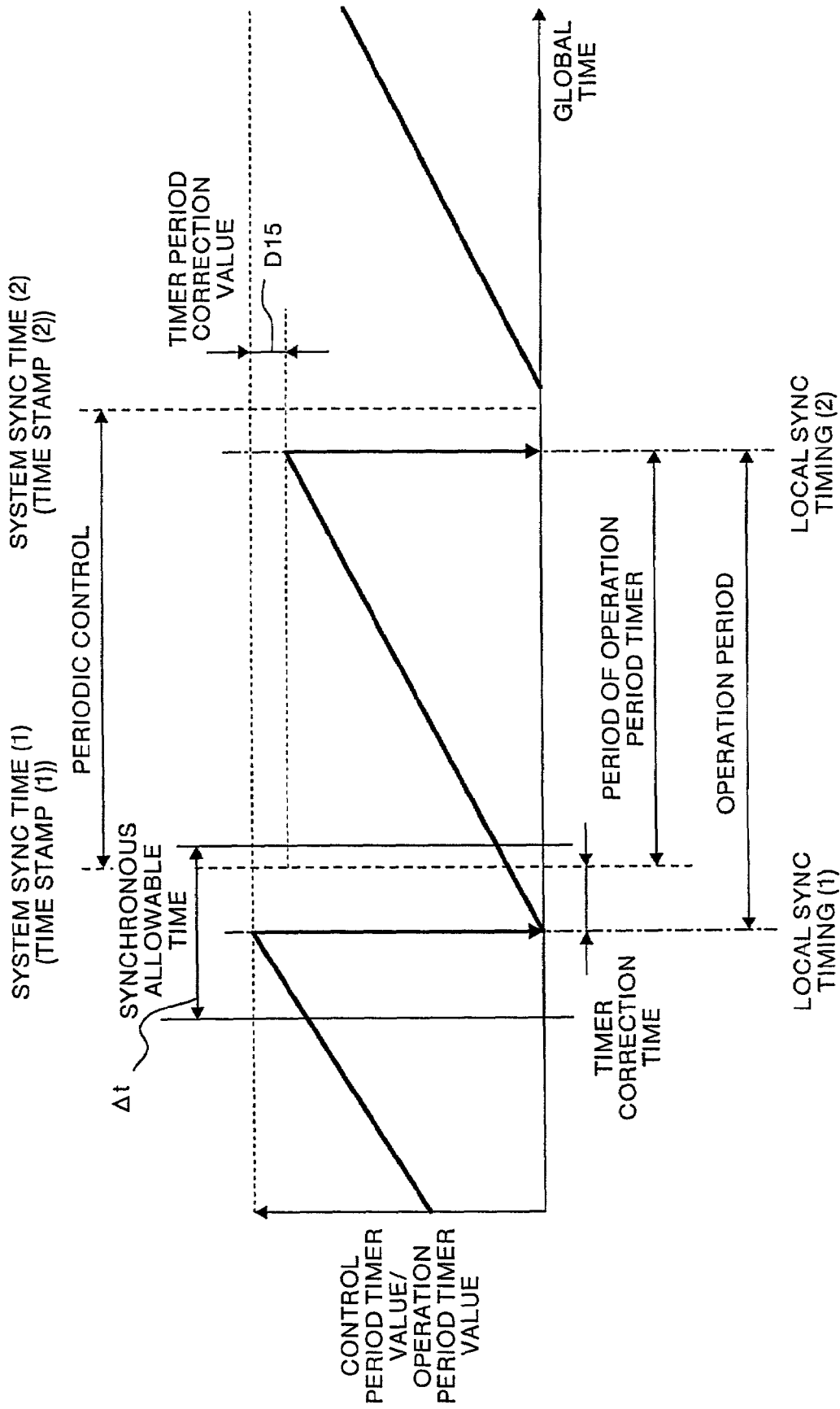
FIG. 15 is a timing chart showing timer period correction when the period of the control period timer the or operation period timer shown in FIG. 10 is shorter than the period of periodic control.

FIG. 15 shows the timer period correction process of the control period timer 10 or operation period timers 11a, 11b, in terms of the global time, when the period of the control period timer 10 or operation period timers 11a, 11b is shorter than the period of the periodic control indicated by the global timers 13, 13a, 13b. The time stamp comparators 15a, 15b calculate timer period correction reset timer value D15 of the operation period timers 11a, 11b, from the time difference between the global time of the global timers 13a, 13b at the local sync timing of the operation period timers 11a, 11b, and the synchronous (system sync) time indicated by the time stamp attached to the received periodic transfer packet 6, and correct the timer period of the operation period timers 11a, 11b. As a result, time deviation between the control period indicated by the control period timer 10, and the operation period timers 11a, 11b is corrected, and the operation period is matched with the control period.

In all cases of timer correction process and timer period correction process shown in FIG. 11 to FIG. 15, at the synchronous (local sync) timing indicated by the operation period timers 11a, 11b, if the time difference between the global time of the global timers 13a, 13b and the synchronous (system sync) time indicated by the time stamp attached to the received periodic transfer packet 6 is not within the synchronous allowable range $\Delta t$, it is recognized that unjust synchronism or stopping of global timers 13, 13a, 13b has occurred due to trouble of network 1 of the like, and the timer correction or timer period correction of operation period timers 11a, 11b is not executed. Accordingly, the operation period timers 11a, 11b continue to clock the time, and sudden stop or runaway of the operation period timers 11a, 11b can be prevented.

Further, at the synchronous (local sync) timing indicated by the operation period timers 11a, 11b, if the time difference between the global time of the global timers 13, 13a, 13b and the synchronous (system sync) time indicated by the time stamp attached to the received periodic transfer packet 6 does not return within the synchronous allowable range Δt, the controller 2 interrupts the periodic control, and forces to synchronize so as not to check synchronous allowable range Δt of the operation period timers 11a, 11b.

Figure 16:
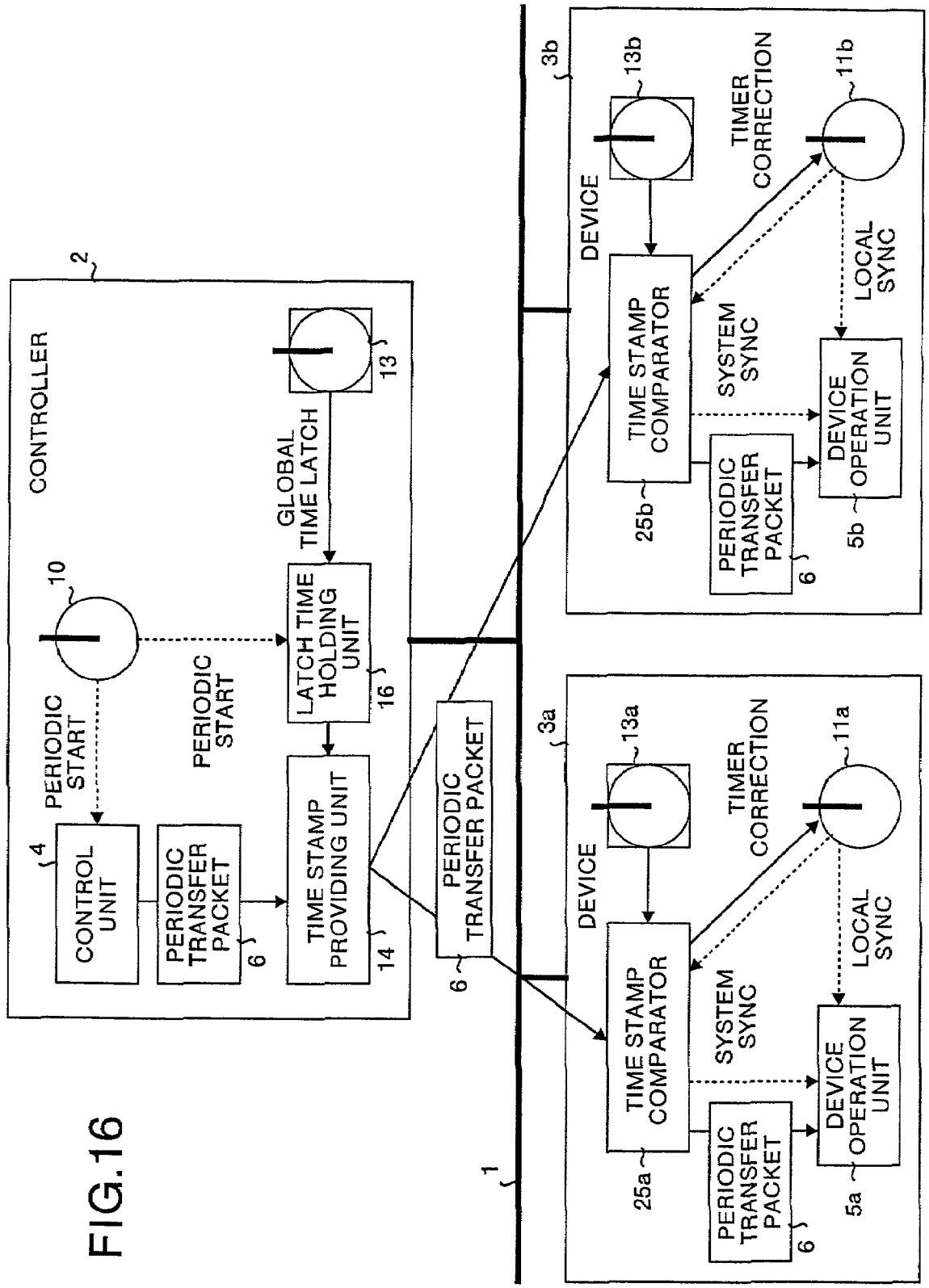
FIG. 16 is a block diagram of a periodic control synchronous system in a fourth embodiment of the invention.

Further, a fourth embodiment of the invention is explained. FIG. 16 is a block diagram of configuration of periodic control synchronous system in the fourth embodiment of the invention. In FIG. 16, a controller 2 is same as the controller 2 shown of the third embodiment, comprising a global timer 13, a control unit 4, a control period timer 10 for periodically starting the control unit 4, a latch time holding unit 16 for latching the global timer 13 at an arbitrary timing and holds the latched time, and a time stamp providing unit 14 for providing the periodic transfer packet 6 periodically transmitted by the control unit 4 to the devices 3a, 3b with a time stamp designated in the global timer time.

On the other hand, the devices 3a, 3b comprise global timers 13a, 13b, device operation units 5a, 5b, operation period timers 11a, 11b for periodically starting the device operation units 5a, 5b, and time stamp comparators 25a, 25b for comparing the time indicated by the global timers 13a, 13b and the time indicated by the time stamp attached to the received periodic transfer packet 6.

Figure 17:
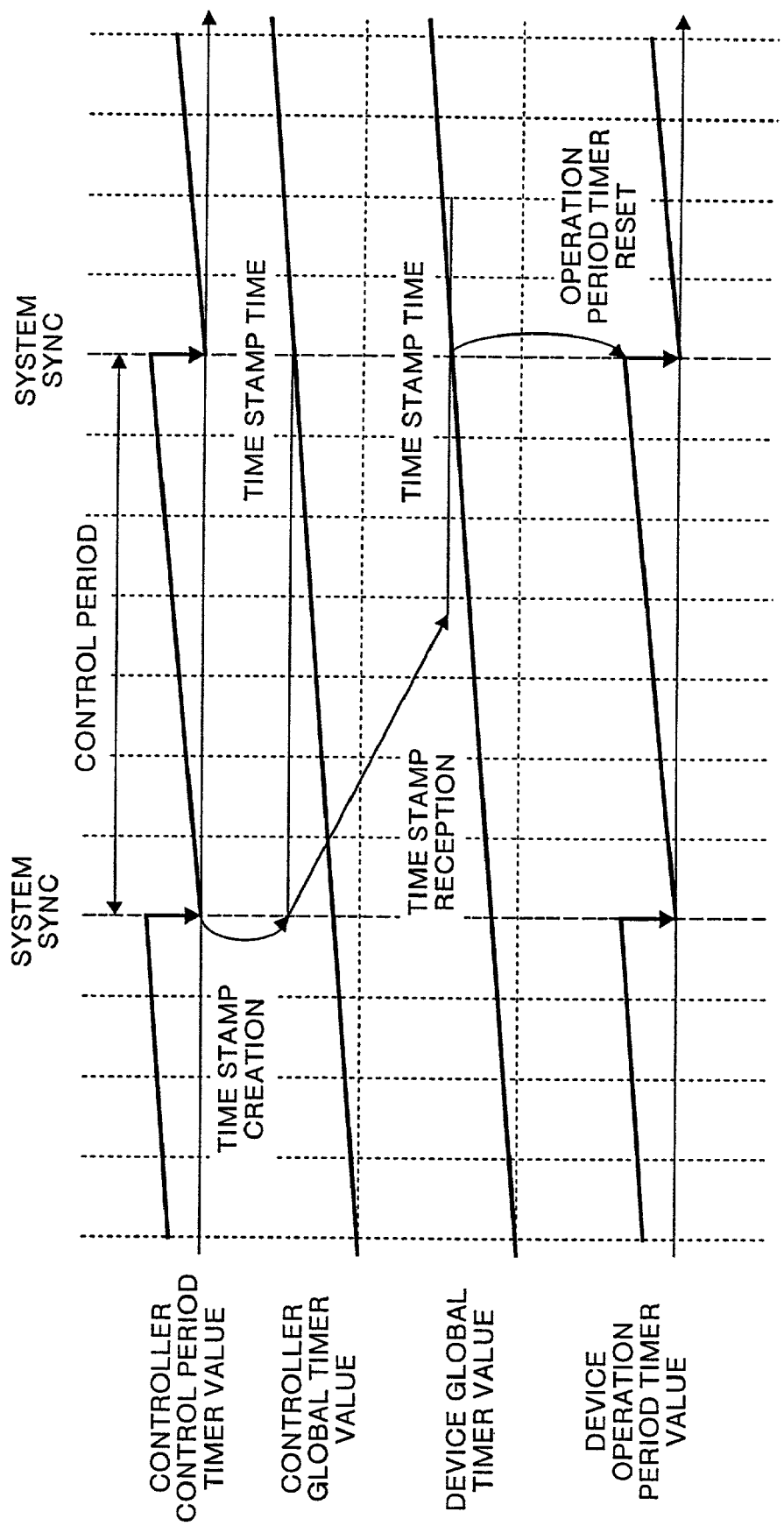
FIG. 17 is a timing chart showing a synchronous process of system sync timing using time stamp.

FIG. 17 is a timing chart showing synchronous processing of local sync timing using the time stamp. In FIG. 17, the latch time holding unit 16 of the controller 2 latches the global timer 13 at the synchronous (system sync) timing of periodic control designated by the control period timer 10. The time stamp providing unit 14 provides the periodic transfer packet 6 with the time stamp having the latched time offset by the portion of the control period, and transmits to the devices 3a, 3b.

The time stamp comparators 25a, 25b of the devices 3a, 3b recognize the synchronous (system sync) timing of periodic control when the time indicated by the time stamp attached to the periodic transfer packet 6 received from the controller is same as or exceeds the time indicated by the global timers 13a, 13b of the devices 3a, 3b, and reset the operation period timers 11a, 11b when the system sync timing occurs earlier than the local sync timing of the operation period timers 11a, 11b of the devices 3a, 3b. In this case, since the operation period timers 11a, 11b are reset, the local sync does not take place.

Further, the time stamp comparators 25a, 25b reset the operation period timers 11a, 11b the local sync timing when the local sync timing of the operation period timers 11a, 11b of the devices 3a, 3b occurs earlier than the system sync timing, and start up the device operation units 5a, 5b. After that, at the system sync timing, the operation period timers 11a, 11b of the devices 3a, 3b are reset again, and the operation period is synchronized with the control period. At the time of the second resetting, the device operation units 5a, 5b are not started up. Therefore, the operation period timers 11a, 11b of the devices 3a, 3b are synchronized with the control period timer 10 of the controller 2, and the control unit 4 of the controller 2 and the device operation units 5a, 5b of the devices 3a, 3b are controlled synchronously.

If the global time is deviated by resetting of the global timers 13, 13a, 13b due to restructuring of the network 1 or the like, once the global timers 13, 13a, 13b of the controller 2 and devices 3a, 3b are synchronized again, the time stamp is generated at the global time after re-synchronization, and the control period is maintained after resetting so as to be controlled continuously.

Figure 18:
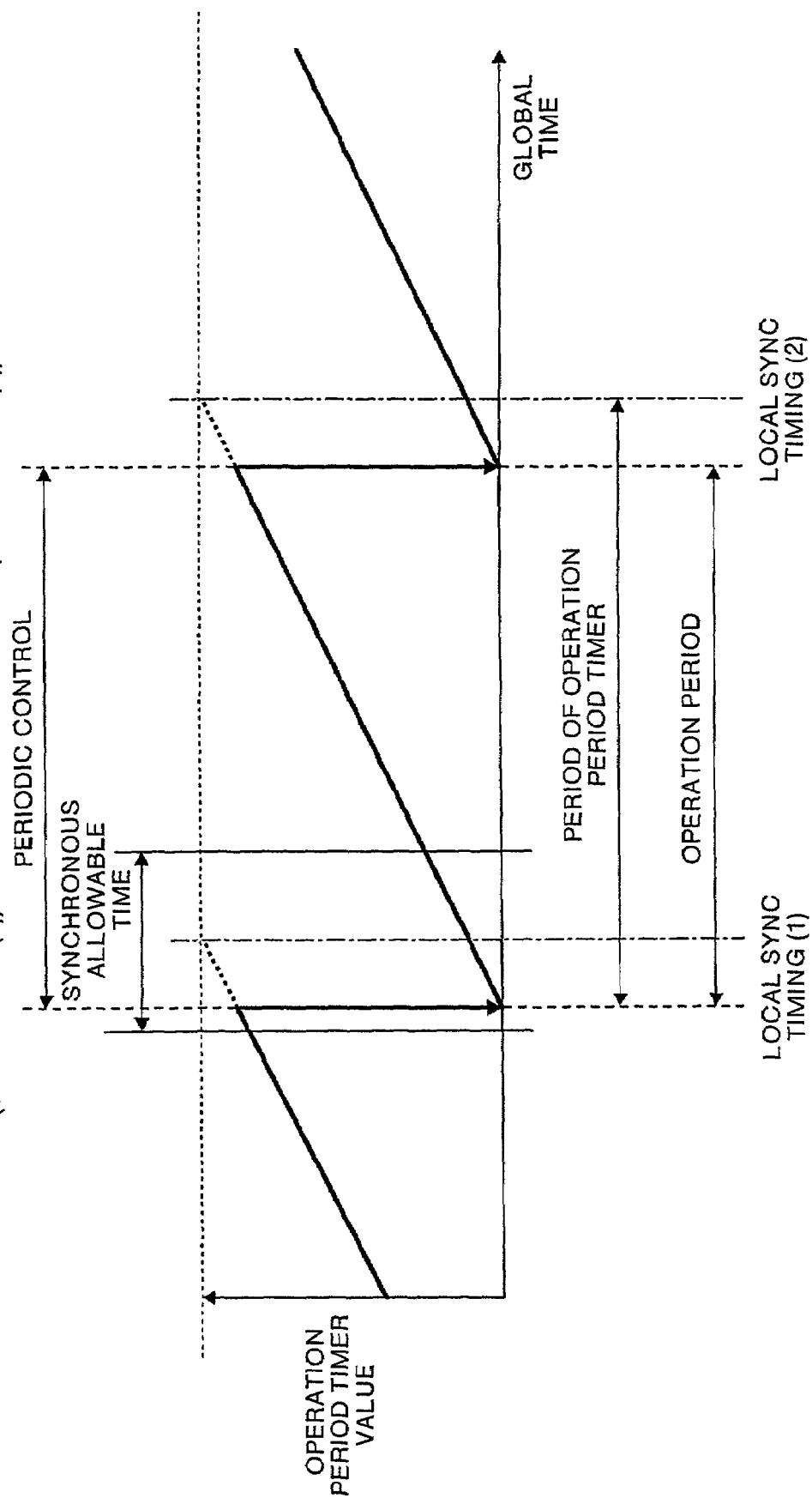
FIG. 18 is a timing chart showing a synchronous process when the system sync timing is ahead of the local sync timing.

FIG. 18 is a timing chart showing the reset process of the operation period timers 11a, 11b, in terms of the global time, when the system sync timing occurs earlier than the local sync timing. In FIG. 18, the time stamp comparators 25a, 25b recognize the synchronous (system sync) timing of periodic control when the time indicated by the global timers 13a, 13b of the devices 3a, 3b reaches the time indicated by the time stamp attached to the received periodic transfer packet 6, and reset the operation period timers 11a, 11b. As a result, the operation period is matched with the control period. In this case, since the operation period timers 11a, 11b are reset by the system sync, no delay occurs when matching the operation period with the control period.

Figure 19:
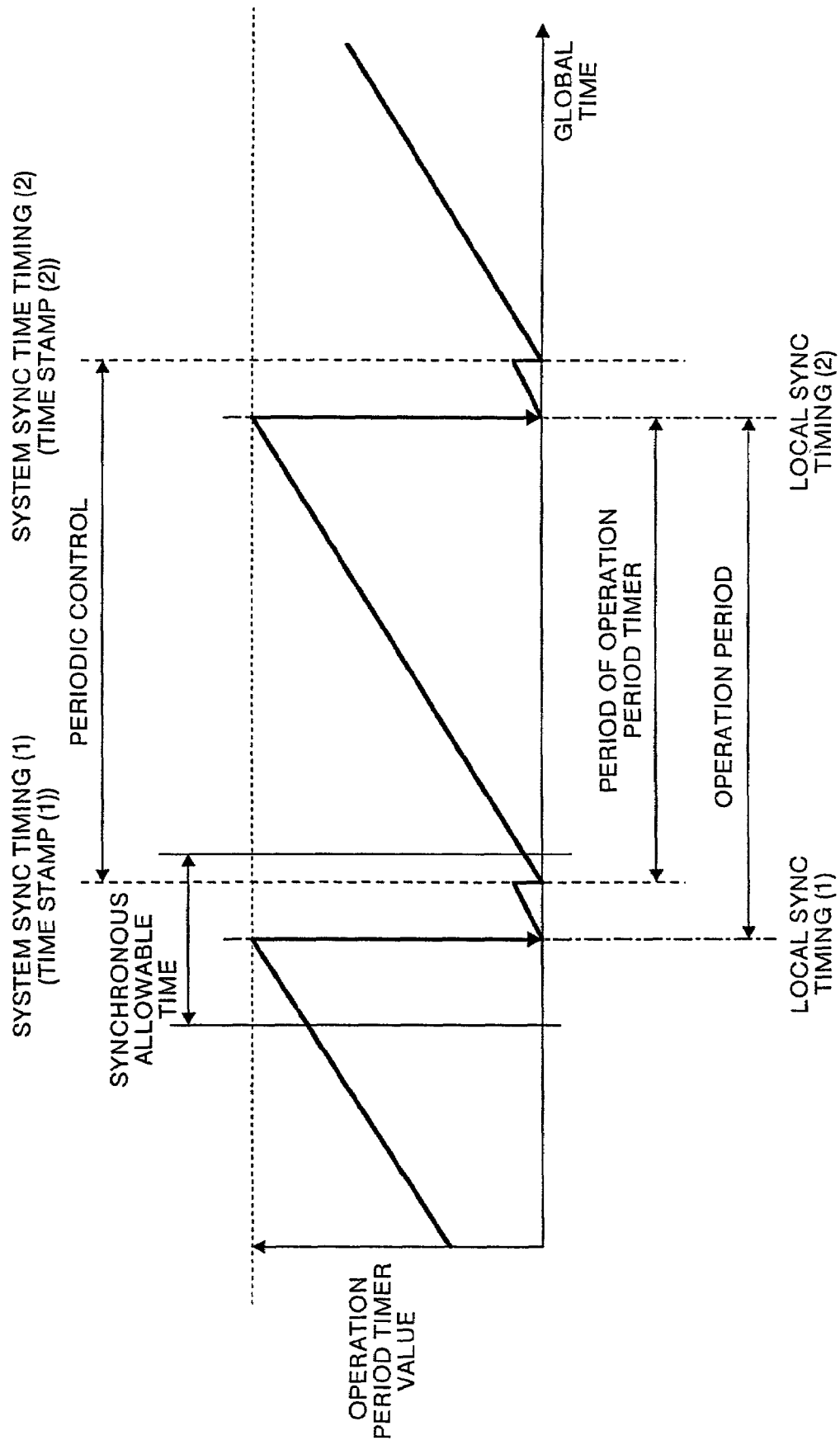
FIG. 19 is a timing chart showing synchronous a process when the local sync timing is ahead of the system sync timing.

FIG. 19 is a timing chart showing an example of reset process of the operation period timers 11a, 11b, in terms of the global time, when the local sync timing occurs earlier than the system sync timing. In FIG. 19, the time stamp comparators 25a, 25b reset the operation period timers 11a, 11b, and start up the device operation units 5a, 5b. After that, at the system sync timing, the operation period timers 11a, 11b of the devices 3a, 3b are reset again, and the operation period is synchronized with the control period. If the time stamp is not obtained due to transmission or reception error of the periodic transfer packet 6 or the like, the operation period timers 11a, 11b are reset at the synchronous (local sync) timing indicated by the operation period timers 11a, 11b, so that the operation period continues stably. Alternatively, if the time stamp is abnormally delayed due to trouble of the controller 2, wrong periodic synchronism (system sync) is avoided.

In FIG. 18 and FIG. 19, if the time difference between the time indicated by the time stamp attached to the received periodic transfer packet 6 and the global time at the synchronous (local sync) time indicated by the operation period timers 11a, 11b is not within a synchronous allowable range Δt, the devices 3a, 3b recognize occurrence of unjust synchronism or stopping of global timers 13, 13a, 13b due to trouble of the network 1 or the like, and do not correct the operation period timers 11a, 11b. Hence, the operation period timers 11a, 11b continue to clock the time, so that sudden stop or runaway of the operation period timers 11a, 11b can be prevented.

Further, at the synchronous (local sync) timing indicated by the operation period timers 11a, 11b, if the time difference between the global time of the global timers 13, 13a, 13b and the synchronous (system sync) time indicated by the time stamp attached to the received periodic transfer packet 6 does not return within the synchronous allowable range Δt, the controller 2 interrupts the periodic control, and forces to synchronize so as not to check synchronous allowable range Δt of the operation period timers 11a, 11b.

Figure 20:
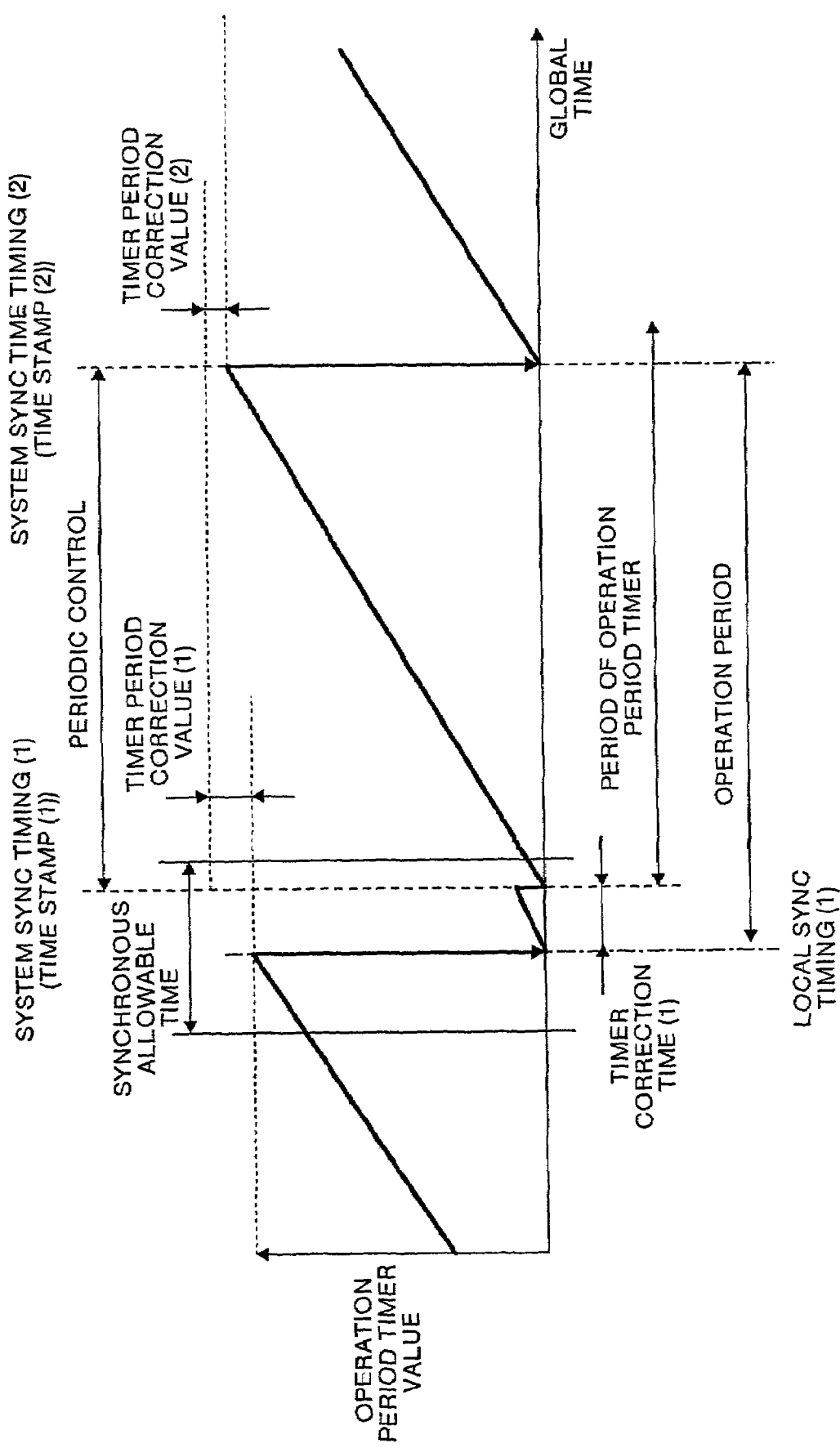
FIG. 20 is a timing chart showing timer period correction.

FIG. 20 is a timing chart showing the process of correction of timer period of the operation period timers 11a, 11b. In FIG. 20, when the local sync indicated by the operation period timers 11a, 11b is earlier than the system indicated by the time stamp, the time stamp comparators 25a, 25b calculate the timer period correction value of the operation period timers 11a, 11b, from the time difference between the global time of the global timers 13a, 13b at the local sync timing of the operation period timers 11a, 11b, and the synchronous (system sync) time indicated by the time stamp attached to the received periodic transfer packet 6, and correct the timer period of the operation period timers 11a, 11b.

Meanwhile, when the local sync indicated by the operation period timers 11a, 11b is behind the system sync indicated by the time stamp, the operation period timers 11a, 11b are reset, and the timer period correction value of the operation period timers 11a, 11b is corrected by using the immediately preceding value, and the timer period of the operation period timers 11a, 11b is corrected, so that the timer period of the operation period timers 11a, 11b may follow up the control period.

Figure 21:
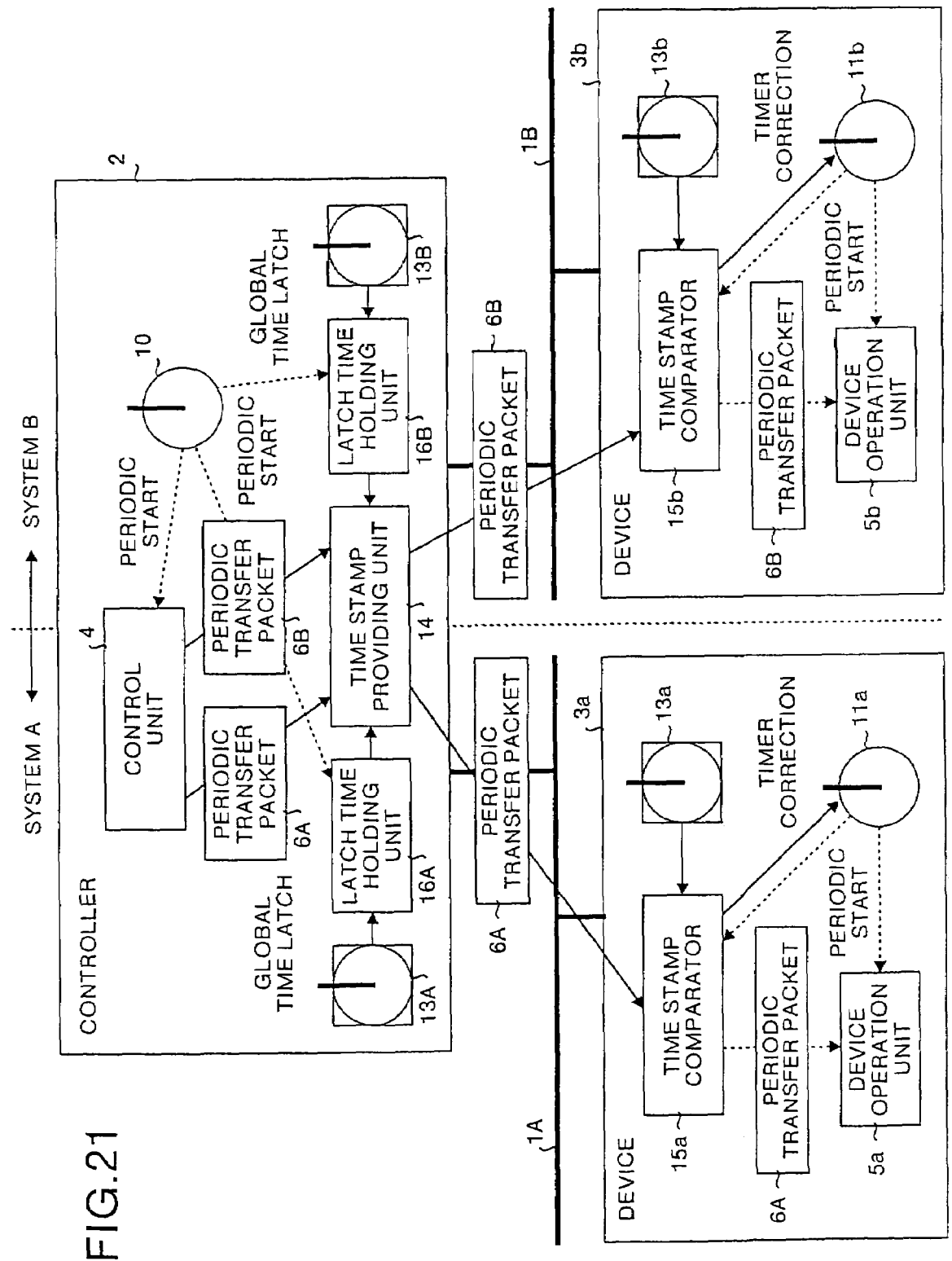
FIG. 21 is a block diagram of a periodic control synchronous system in a fifth embodiment of the invention.

Finally, a fifth embodiment of the invention is explained. FIG. 21 is a block diagram of configuration of periodic control synchronous system in the fifth embodiment of the invention. In FIG. 21, a controller 2 is connected to networks 1A, 1B of plural systems A and B. A device 3a is connected to the network 1A of system A, and a device 3b is connected to the network 1B of system B.

The controller 2 comprises global timers 13A, 13B of systems A, B, latch time holding units 16A, 16B for latching the global timers 13A, 13B of systems A, B, and holding the latched time, a control unit 4, a control period timer 10 for periodically starting the control unit 4, and a time stamp providing unit 14 for providing the periodic transfer packets 6A, 6B periodically transmitted to the devices 3a, 3b of systems A, B with a time stamp designated in the global timer time.

The devices 3a, 3b comprise, same as in the third embodiment, global timers 13a, 13b, device operation units 5a, 5b, operation period timers 11a, 11b for periodically starting the device operation units 5a, 5b, and time stamp comparators 15a, 15b for comparing the time indicated by the global timers 13a, 13b and the time indicated by the time stamp attached to the received periodic transfer packets 6A, 6B.

Figure 22:
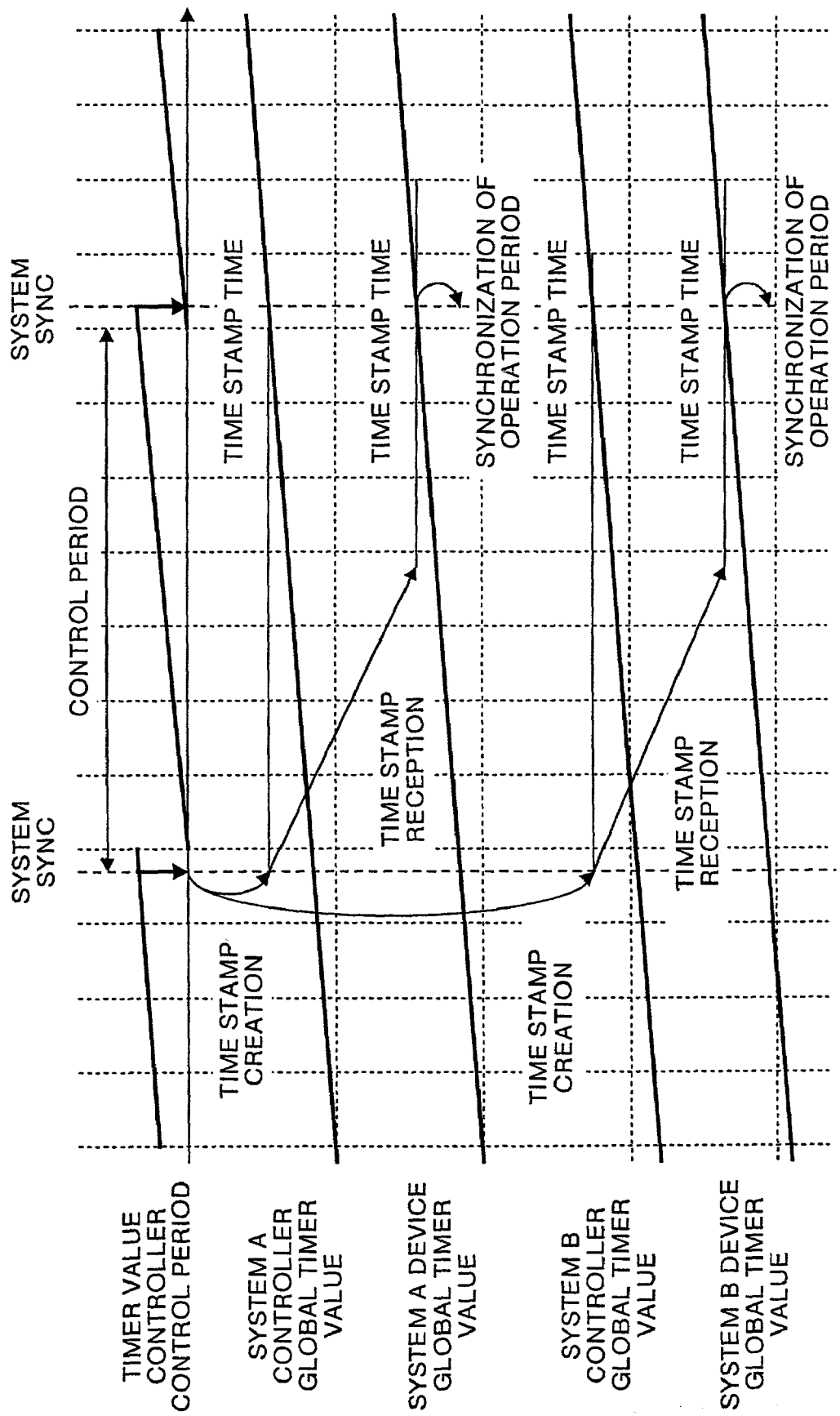
FIG. 22 is a timing chart showing a synchronous process of multi-system periodic control using time stamp.
Figure 23:
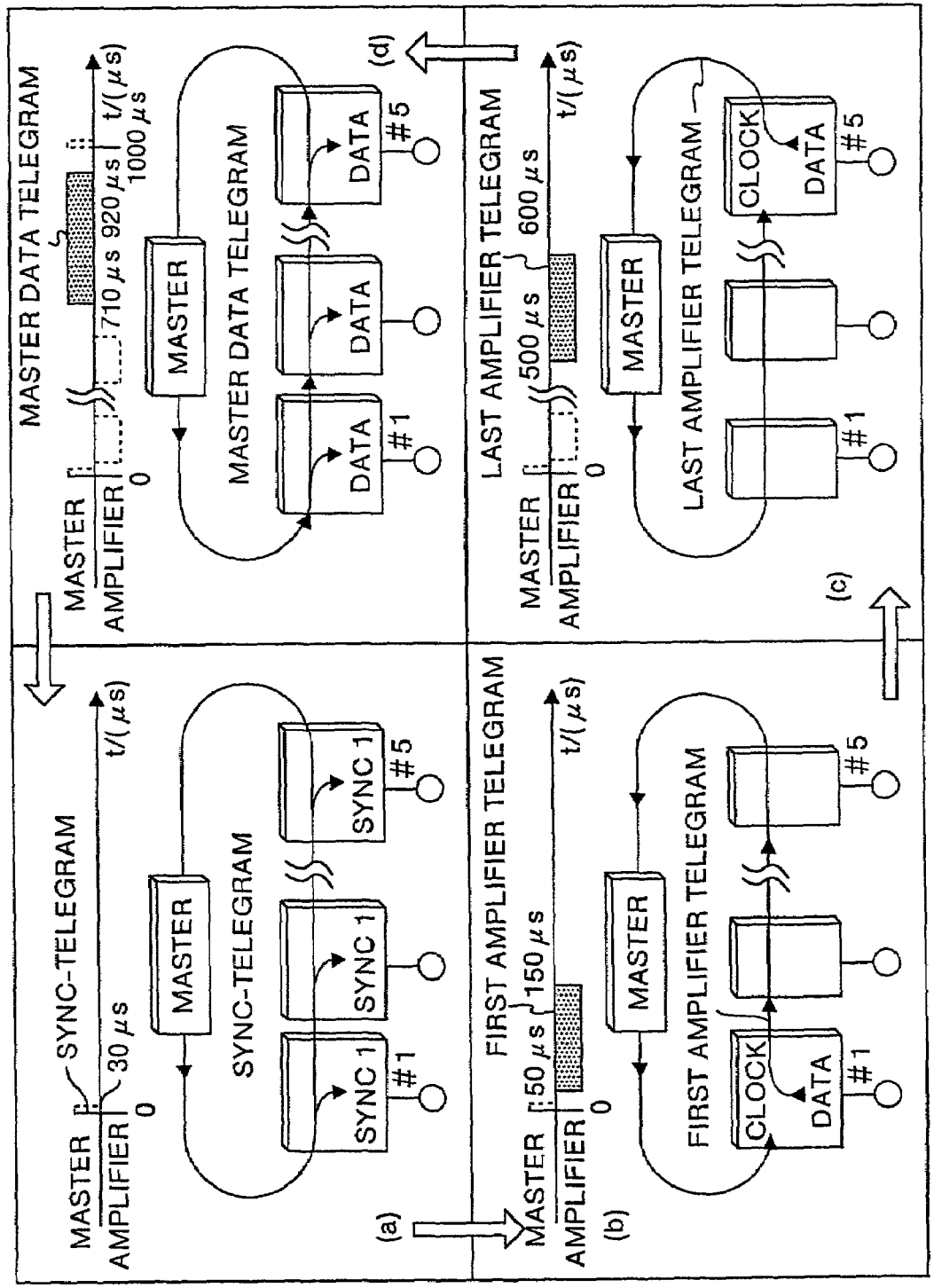
FIG. 23 is a diagram showing a conventional periodic control synchronous system using a SERCOS interface.

The controller 2 controls to latch the global timer 13A by the latch time holding unit 16A of system A, and latch the global timer 13B b the latch time holding unity 16B of system B, at the synchronous (system sync) timing designated by the control period timer 10. The time stamp providing unit 14 provides the periodic transfer packet 6A with the time stamp having the latched time of system A offset by the portion of the control period, and transmits to the device 3a, and provides the periodic transfer packet 6B with the time stamp having the latched time of system B offset by the portion of the control period, and transmits to the device 3b (see FIG. 22).

The device 3a determines the timer correction value or timer period correction value of the operation period timer 11a, from the time difference between the synchronous (system sync) time indicated by the time stamp attached to the received periodic transfer packet 6A and the time indicated by the global timer 13a, at the synchronous (local sync) timing indicated by the operation period timer 11a, and sets this timer correction value or timer period correction value in the operation period timer 11a. Similarly, the device 3b determines the timer correction value or timer period correction value of the operation period timer 11b, from the time difference between the synchronous (system sync) time indicated by the time stamp attached to the received periodic transfer packet 6B and the time indicated by the global timer 13b, at the synchronous (local sync) timing indicated by the operation period timer 11b, and sets this timer correction value or timer period correction value in the operation period timer 11b. As a result, the control period timer 10 of the controller 2 is synchronized with the operation period timer 11a of the device 3a of system A and the operation period timer 11b of the device 3b of system B, so that the control unit 4 of the controller 2 and the devices 13a, 13b of systems A and B are controlled synchronously.

Besides, by the latch time holding units 16A, 16B independently installed in systems A, B, the time stamp showing accurate system sync time of systems A and B can be calculated. Further, if the global time is deviated between systems A and B due to resetting of global timers 13A, 13B by restructuring of the networks 1A, 1B of systems A, B, since the global time is latched in every system A and B at the timing of the system sync, the devices 3a, 3b of different systems A, B can be synchronized continuously, and after resetting, therefore, the control synchronism is held and continuous control is realized.

As explained herein, according to one aspect of this invention, one or more controllers connected to a network and one or more devices connected to the network are synchronized in periodic control by generating synchronous timing of the periodic control between the controller and device, by using the global time indicated by the global timer controlled through the network, and therefore the periodic transfer speed of periodic packet does not cause effect on the precision of synchronism of periodic control without synchronizing the periodic control by the periodic transfer timing of the periodic packet transferred uniformly, so that packet transfer of large size or asynchronous communication between slave devices is possible while maintaining the synchronous control of periodic control, thereby realizing a flexible communication.

Furthermore, the transmitting unit of the controller transmits the synchronous timing time using the global time indicated by the master global timer to the device as periodic transfer packet, and the periodic control unit of the device controls the period by using the synchronous timing time of the periodic transfer packet transmitted by the transmitting unit and the global time indicated by the slave global timer, and therefore the control period of the controller is free from effects of time deviation due to synchronism of the global timer, and the precision of time designation by using the control period timer is maintained, and moreover since the controller can designate the synchronous timing of global timers of all devices, the global timers of the devices can be synchronized at a timing convenient for the device operation function of the devices, so that the precision of time designation is assured.

Furthermore, the correcting unit of the device determines the time difference between the global time indicated by the global timer of the device and the synchronous timing time indicted by the controller at the synchronous timing indicated by the operation period timer, and determines the timer correction value or timer period correction value of the operation period timer on the basis of the obtained time difference, and thereby corrects the operation period timer, and therefore the operation period timer can be updated at a timing convenient for the device operation function, and the precision of time designation by using the operation period timer is assured without having effects of time deviation due to time synchronism between global timers occurring at an arbitrary timing.

Furthermore, the detecting unit detects whether the time difference is within a specified allowable range or not, and the correcting unit controls to correct the operation period timer on the basis of the timer correction value or timer period correction value when the time difference is within the specified allowable range, and not to correct the operation period timer when the time difference is out of the specified allowable range, and therefore in the event of unjust synchronism or stopping of global timers de to network trouble of the like, the operation period timers continue to clock the operation period, so that sudden stop or runaway of operation period timers can be prevented.

Furthermore, the correcting unit of the controller corrects the control period timer by determining the time difference between the global time indicated by the global timer of the controller and the synchronous timing time indicted by the controller at the synchronous timing indicated by the control period timer, and determines the timer correction value or timer period correction value of the control period timer on the basis of the obtained time difference, and therefore the control period timer can be updated at a timing convenient for the control function of the controller, and the precision of time designation by using the control period timer is assured without having effects of time deviation due to time synchronism between global timers occurring at an arbitrary timing.

Furthermore, the detecting unit detects whether the time difference is within a specified allowable range or not, and the correcting unit controls to correct the control period timer on the basis of the timer correction value or timer period correction value when the time difference is within the specified allowable range, and not to correct the control period timer when the time difference is out of the specified allowable range, and therefore in the event of unjust synchronism or stopping of global timers de to network trouble of the like, the control period timer continues to clock the control period, so that sudden stop or runaway of control period timer can be prevented.

According to another aspect of this invention, the time stamp providing unit provides the periodic transfer packet with the time stamp showing the synchronous timing of the period control designated by the control period timer by using the global time indicated by the first global timer, the transmitting unit transmits the periodic transfer packet provided with the time stamp to the device, and the periodic control unit synchronizes the operation period of the device with the control period by using the synchronous timing time of the periodic control indicated by the time stamp of the periodic transfer packet transmitted by the transmitting unit and the global time indicated by the second global timer, and therefore the timer not relating to the structure or precision of the global timers can be used, the precision of control period can be maintained regardless of time deviation due to time synchronism between global timers, and the operation period timers of entire systems can be synchronized at a timing convenient for the controller.

Furthermore, the control period timer latches the global time of the first global timer in the latch unit at the synchronous timing of the periodic control designated by the control period timer, and the time stamp providing unit provides the periodic transfer packet with the time stamp having the global time latched by the latch unit offset by the portion of the control period, and therefore the time stamp for showing an accurate synchronous time for periodic control can be calculated, and calculation of time stamp and writing of time stamp to packet can be easily processed by the software.

Furthermore, the correcting unit of the device corrects the operation period timer by determining the time difference between the synchronous timing time of the periodic control indicated by the time stamp compared by the comparing unit and the global time indicated by the second global timer at the synchronous timing indicated by the operation period timer, and determines the timer correction value or timer period correction value of the operation period timer on the basis of the obtained time difference, and therefore since comparison timing of time stamp and global timer is determined, the structure of the comparing unit is simple, and in particular it can be composed of software, and the control period is maintained after resetting, without being influenced by resetting of the global timers due to restructuring of the network or the like, so that continuous control is possible.

Furthermore, the detecting unit detects whether the time difference is within a specified allowable range or not, and the correcting unit controls to correct the operation period timer on the basis of the timer correction value or timer period correction value when the time difference is within the specified allowable range, and not to correct the operation period timer when the time difference is out of the specified allowable range, thereby avoiding wrong synchronous correction, and therefore if the time indicated by the time stamp and the time indicated by the operation period timer are largely different due to controller trouble, it is effective not to synchronize with the wrong periodic control.

Furthermore, the comparing unit compares the synchronous timing time of the periodic control indicated by the time stamp of the periodic transfer packet transmitted by the transmitting unit and the global time indicated by the second global timer, and the correcting unit resets the operation period timer when the global time indicated by the second global timer reaches the synchronous timing time of the periodic control indicated by the time stamp, and therefore the control period is maintained after resetting, without being influenced by resetting of the global timers due to trouble of the network or the like, so that continuous control is possible.

Furthermore, the correcting unit resets the operation period timer when reaching the synchronous timing indicated by the operation period timer before the global time indicated by the second global timer reaches the synchronous timing time of the periodic control indicated by the time stamp, and resets the operation period timer again later when the synchronous timing time of the periodic control indicated by the time stamp reaches or exceeds the global time indicated by the second global timer, and therefore if the time stamp is not obtained due to transmission or reception error of the periodic transfer packet, the operation period timer is reset at the synchronous timing indicated by the operation period timer, and if the time stamp is abnormally delayed due to controller trouble, it is effective not to synchronize with the wrong periodic control.

Furthermore, the detecting unit detects whether the time difference between the synchronous timing time of the periodic control indicated by the time stamp compared by the comparing unit and the global time indicated by the second global timer at the synchronous timing indicated by the operation period timer is within a specified allowable range or not, and the correcting unit controls not to correct the operation period timer when the time difference is out of the specified allowable range, and therefore if the time indicated by the time stamp and the time indicated by the operation period timer are largely different due to controller trouble, it is effective not to synchronize with the wrong periodic control.

Furthermore, the correcting unit determines the timer periodic correction value of the operation period timer by finding the value of the operation period timer at the synchronous timing of the periodic control indicated by the time stamp, or determines the timer periodic correction value of the operation period timer from the time difference between the synchronous timing time of the periodic control indicated by the time stamp and the global time indicated by the second global timer, and corrects the operation period timer on the basis of the obtained timer periodic correction value, so that the operation period of the device is precisely synchronized with the control period of the controller.

According to still another aspect of this invention, the time stamp providing unit of the controller provides the periodic transfer packet transmitted periodically to the first and second networks with the time stamp showing the synchronous timing of the period control designated by the control period timer by using the global time indicated by the first and second global timers, the first and second transmitting unit transmit the periodic transfer packet provided with the time stamp to one or more devices connected to the corresponding first and second networks, and the periodic control unit of one or more devices connected to the first and second networks synchronize the operation period of the corresponding device with the control period by using the synchronous timing time of the periodic control indicated by the time stamp of the periodic transfer packet transmitted by the first and second transmitting unit and the global time indicated by the third global timer, and therefore the operation period of one or more devices connected to each network is synchronized with the control period of the controller connected to the plural networks.

Furthermore, the control period timer of the controller latches the global time of the first and second global timers in the first and second latch unit at the synchronous timing of the periodic control designated by the control period timer, and the time stamp providing unit provides the periodic transfer packet with the time stamp having the global time latched by the first and second latch unit offset by the portion of the control period, and therefore time stamp for showing an accurate synchronous time for periodic control can be calculated, and calculation of time stamp and writing of time stamp to packet can be easily processed by the software.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A periodic control synchronizing system for synchronizing periodic control between a controller connected in a network and devices connected to said network, wherein
    said controller includes a first global timer and each of said devices comprises a respective second global timer controlled by said controller through said network, each of said devices farther including
        an operation period timer which generates a synchronizing time for synchronizing periodic control of said device; and
        a timer synchronizing unit which
            determines a first time difference between a global time, indicated by said second global timer of said device, at the synchronizing time, and a synchronizing time indicated by said first global timer, and
            determines a timer correction value of said operation period timer, based on the first time difference, wherein said operation period timer is corrected by said timer synchronizing unit, based on the timer correction value, at the synchronizing time.

2. The periodic control sychronizing system according to claim 1, wherein
    said first global timer of said controller is a master global timer,
    each of said second global timers of said devices is a slave global timer,
    said controller comprises a transmitting unit which transmits the synchronizing time, using global time indicated by the master global timer, to said devices as a periodic transfer packet, and
    each of said devices comprises a periodic control unit which performs periodic control using the synchronizing time of the periodic transfer packet transmitted by said transmitting unit and the global time indicated by said slave global timer.

3. The periodic control synchronizing system according to claim 1, wherein said timer synchronizing unit includes a detecting unit which detects whether the first time difference is within an allowable range, corrects said operation period timer based on the timer correction value when the time difference is within an allowable range, and does not correct said operation period timer when the time difference is outside of the allowable range.

4. The periodic control synchronizing system according to claim 1, wherein said controller further includes
    a control period timer which control a control period of said controller; and
    a timer synchronizing unit which
        corrects said control period timer by determining a second time difference between the global time, indicated by said first global timer of said controller, and the synchronizing time indicated by said controller, at a timing indicated by said control period timer, and
        determines a timer correction value of said control period timer based on the second time difference.

5. The periodic control synchronizing system according to claim 4, wherein said timer synchronizing unit detects whether the first time difference is within a specified allowable range, corrects said control period timer based on the timer correction value when the first time difference is within an allowable range, and does not correct said control period timer when the first time difference is outside of the allowable range.

6. A periodic control synchronizing system for synchronizing periodic control between a controller connected in a network and devices connected to said network, wherein
    said controller includes
        a first global timer;
        a control period timer which generates a control period for periodic control of said controller;
        a time stamp providing unit which provides a periodic transfer packet with a time stamp showing a synchronizing timing synchronizing time of the control period, indicated by said control period timer, using global time indicated by said first global timer; and
        a transmitting unit which transmits the periodic transfer packet provided with the time stamp to said devices, and
    each of said devices includes
        a second global timer controlled through said network;
        a periodic control unit which synchronizes operation period of said device with the control period using the synchronizing time of the periodic control, indicated by the time stamp of the periodic transfer packet transmitted by said transmitting unit, and global time indicated by said second global timer;
        an operation period timer which generates a synchronizing time for synchronizing periodic control of said device; and a comparing unit which
compares the synchronizing time of the periodic control, indicated by the time stamp of the periodic transfer packet transmitted by said transmitting unit, and the global time indicated by said second global timer,
determines a time difference between the synchronizing time of the periodic control, indicated by the time stamp, and the global time indicated by said second global timer, and
determines a timer correction value of said operation control period timer based on the time difference, wherein said operation period timer is corrected by said comparing unit, based on the timer correction value, at the synchronizing time.

7. The periodic control synchronizing system according to claim 6, wherein
said controller comprises a latch unit which latches the global time of said first global timer, and holds the time latched,
said control period timer latches the global time of said first global timer in said latch unit at the synchronizing time of the periodic control indicated by said control period timer, and
said time stamp providing unit provides the periodic transfer packet with the time stamp having the global time latched by said latch unit, offset by a portion of the control period.

8. The periodic control synchronizing system according to claim 6, wherein said comparing unit, which detects whether the time difference is within an allowable range, corrects said operation period timer, based on the timer correction value, when the time difference is within the allowable range, and does not correct said operation period timer when the time difference is outside of the allowable range.

9. The periodic control synchronizing system according to claim 6, wherein said comparing unit resets said operation period timer when the global time, indicated by said second global timer, reaches the synchronizing time of the periodic control indicated by the time stamp.

10. The periodic control synchronizing system according to claim 9, wherein said comparing unit resets said operation period timer when reaching the synchronizing time, indicated by said operation period timer, before the global time, indicated by said second global timer, reaches the synchronizing time of the periodic control, indicated by the time stamp, and resets said operation period timer again, later, when the synchronizing time of the periodic control, indicated by the time stamp, at least reaches the global time indicated by said second global timer.

11. The periodic control synchronizing system according to claim 9, wherein said comparing unit, which detects whether the time difference between the synchronizing time of the periodic control, indicated by the time stamp, compared by said comparing unit, and the global time, indicated by said second global timer, at the synchronizing time, indicated by said operation period timer, is within an allowable range, and does not correct said operation period timer when the time difference is outside of the allowable range.

12. The periodic control synchronizing system according to claim 9, wherein said comparing unit determines a timer period correction value of said operation period timer from the time difference between the synchronizing time of the periodic control, indicated by the time stamp, and the global time, indicated by said second global timer, and thereby corrects said operation period timer based on the timer period correction value.

* * * * *